United States Patent
Hoogduin et al.

(10) Patent No.: US 12,496,992 B2
(45) Date of Patent: Dec. 16, 2025

(54) FUEL CELL AND $H_2$ STORAGE IMPACT PROTECTION SYSTEM FOR VEHICLES

(71) Applicant: Hyster-Yale Group, Inc., Fairview, OR (US)

(72) Inventors: Joost Hoogduin, Nijmegen (NL); Menno de Lint, Oud Gastel (NL); Bram Kuipers, Velp (NL)

(73) Assignee: Hyster-Yale Materials Handling, Inc, Fairview, OR (US)

( * ) Notice: Subject to any disclaimer, the term of this patent is extended or adjusted under 35 U.S.C. 154(b) by 206 days.

(21) Appl. No.: 18/106,557

(22) Filed: Feb. 7, 2023

(65) Prior Publication Data

US 2024/0262306 A1    Aug. 8, 2024

(51) Int. Cl.
*B60R 21/0136*    (2006.01)
*B60R 19/48*    (2006.01)
*B66F 17/00*    (2006.01)

(52) U.S. Cl.
CPC .......... *B60R 19/48* (2013.01); *B60R 21/0136* (2013.01); *B66F 17/00* (2013.01)

(58) Field of Classification Search
CPC ................................................. B60R 21/0136
See application file for complete search history.

(56) References Cited

U.S. PATENT DOCUMENTS

2016/0023548 A1    1/2016    Crist et al.

FOREIGN PATENT DOCUMENTS

| CN | 113602106 A | * | 11/2021 | ............ B60L 3/0007 |
|---|---|---|---|---|
| CN | 113322782 B | * | 10/2022 | ............ E04H 9/021 |
| CN | 118343074 A | * | 7/2024 | ............ B60R 19/28 |
| EP | 2330007 A1 | | 6/2011 | |
| EP | 3741598 A1 | * | 11/2020 | ............ B60R 19/48 |
| EP | 3741598 B1 | * | 11/2021 | ............ B60R 19/34 |
| FR | 2944240 B1 | * | 10/2012 | |
| JP | 2006151249 A | * | 6/2006 | |
| JP | 5831597 B1 | * | 12/2015 | ............ B60L 50/71 |

(Continued)

OTHER PUBLICATIONS

Extended European Search Report, EPO Patent Appl. No. 23203791.1 (Jun. 17, 2025).

(Continued)

*Primary Examiner* — Nicole T Verley

(57) ABSTRACT

An impact protection structure includes an impact frame and one or more impact bars connected to the impact frame through one or more impact buffers. The impact buffers are configured to linearly absorb an impact force over a predetermined displacement distance. The impact bars can include slotted holes for receiving hinge pins connecting the impact bars to the impact buffers. The impact frame can be connected to a vehicle frame in a manner that permits some deformation of the vehicle frame without deforming the impact frame. One or more sensors can be provided to detect impacts. An impact alert signal can trigger a drive-inhibit function that removes torque from the drive motor. A manual override can permit an operator to drive the vehicle during the drive-inhibit function until the drive-inhibit function is reset by authorized service personnel. Additional equipment can be retrofitted to the vehicle using the impact frame.

15 Claims, 21 Drawing Sheets

(56) References Cited

FOREIGN PATENT DOCUMENTS

| JP | 2022116410 A | 8/2022 | |
|---|---|---|---|
| JP | 2024024932 A * | 2/2024 | ............... B60K 1/04 |
| WO | WO-2010137149 A1 * | 12/2010 | ............... B60L 58/33 |

OTHER PUBLICATIONS

European Search Report, EPO Patent Appl. No. 23203791.1 (Sep. 9, 2024).
Partial European Search Report, Appl. 23203791.1 (Apr. 24, 2024).

* cited by examiner

US 12,496,992 B2

FUEL CELL AND H₂ STORAGE IMPACT PROTECTION SYSTEM FOR VEHICLES

TECHNICAL FIELD

This disclosure relates generally to methods and mechanisms for protecting fuel cells, hydrogen ("H$_2$") storage, and other systems installed in materials-handling vehicles, such as lift trucks or reach trucks (stackers). Particularly, this disclosure relates to methods and mechanisms for providing impact protection to externally mounted components.

BACKGROUND INFORMATION

Conventional fuel-cell vehicles may use hydrogen-powered fuel cells to power an electric motor and other electric vehicle components. Such vehicles may include a battery pack, fuel cells, and hydrogen cylinders attached by brackets to a longitudinally arranged main frame of the vehicle. The hydrogen cylinders contain fuel for the fuel cells which oxidize the hydrogen to create electricity. The hydrogen fuel cells may be provided with radiators arranged along both sides of the main frame. While conventional systems are designed to make efficient use of space, they lack efficient protection for components mounted along the outside of the vehicle.

OVERVIEW OF DISCLOSURE

The Applicant is the owner of copending U.S. patent application Ser. No. 17/980,797 ("the '797 application"), filed Nov. 4, 2022, the entire disclosure of which is incorporated herein by reference. As disclosed in the '797 application, a modular system for mounting fuel cells, H$_2$ storage systems, and other components can be provided. According to that disclosure, a conventional vehicle frame can accommodate one or more hydrogen fuel cells, hydrogen cylinders, an electric drive train, EMC (electromagnetic compatibility) filter boxes, DC/DC inverters, cooling systems, and rechargeable batteries (e.g., lithium-ion ("Li-ion") batteries) provided in a modular manner. The electric drive train of the vehicle is preferably arranged in a space between the longitudinal side frames of the main frame. Brackets are attached to each of the side frames to receive modular frames. The modular frames may be secured to the frame before adding the battery, fuel cell, and/or hydrogen cylinder and other components in the modular frames or the components can be arranged in a modular frame before the modular frame is attached to the main frame.

Modular frames support configurability for different application demands. For example, different combinations of fuel cells, hydrogen storage containers, cooling systems, batteries, etc., can be assembled into a vehicle at a customer facility depending on the customer's needs rather than being provided in a single preassembled configuration from the factory. Using modular frames also makes it simple to upgrade/downgrade to higher/different configurations within a manufacturing facility or by dealers. For instance, an entire modular frame can be easily removed from a truck and replaced with a new modular frame containing upgraded or different components, or components can be removed or replaced within a modular frame arranged on a vehicle.

Moreover, use of the same integration parts like tubing, cables, and radiators is facilitated and helps reduce costs by permitting higher parts volumes and lesser part numbers to maintain. The mechanical and electrical connections between the truck and the components contained in a modular frame can be made identical, or nearly identical, which can lead to use of fewer parts across different truck configurations. This use of modular frames results in a much more efficient placement of components for service, assembly, and line/cable routing, along with reduced expense and complexity in vehicle manufacture.

However, the use of modular frames can also result in expensive vehicle components being arranged outside of the main frame of the vehicle. These expensive components are therefore more exposed to damage from collisions or other external impacts to the vehicle.

According to principles of the present inventive concepts, an impact protective structure is arranged to provide impact protection along each side of the vehicle to protect components located along the vehicle sides outside of the vehicle's main frame. The impact protective structure preferably includes one or more impact bars arranged along an outside of the vehicle components and one or more impact buffers connecting the impact bar(s) to an impact frame. The impact bar(s) can be positioned in any desired height relative to the vehicle frame to optimize the impact protective aspect of the design. The impact frame can be connected to the vehicle frame. One or more reaction arms can also be provided to transfer non-axial side impact forces (loads) into the impact frame and main vehicle frame and ensure that the buffers receive only axial forces.

The impact buffers are preferably designed to linearly (axially) absorb an impact force/energy over a predetermined distance (e.g., 100 mm). Contrasted to other buffers, which require more (exponential) force as the compression increases, the impact buffers according to present inventive concepts move up to the predetermined distance (e.g., 100 mm) under a fixed, linear force. The impact buffers are also preferably designed to slowly return to their original positions (extended outwards) once the impact force is removed without the need for additional servicing or replacement. The impact buffers can, for instance, be off-the-shelf rubber impact buffers such as those available from ACE Controls Inc. or Oleo Inc.

The outer impact bars, impact buffers, and reaction arms are preferably the only components of the impact protective structure that move a substantial distance in relation to the vehicle frame. The impact frame itself is preferably rigidly or semi-rigidly connected to the vehicle frame. For instance, brackets can be used to connect the impact frame to the vehicle frame with bolts arranged to connect impact frame brackets with vehicle frame brackets. In one embodiment, the bolts are provided with plastic (or other elastic or semi-elastic material) bushings arranged between the mounting holes on the vehicle frame bracket and the bolts/pins connecting it to the impact frame bracket. The bushings allow some elastic movement of the truck frame (i.e., due to loadings) without substantially displacing the impact frame.

The impact bars can, for example, be made from S355 bended U-plates that are welded together. The impact bars preferably provide high bending resistance. The impact bars can be connected to the impact buffers using hinge pins. The hinge pins can be arranged in a slotted hole formed through the impact bar to provide for both rotational movement and side to side movement of the impact bar at the contact point between the impact bar and to the impact buffer. This permits an impact force to compress one or more impact buffers and increase the distance between buffers without stressing or deforming the contact points between the impact bars and buffers. Bronze (or other material) bearings can further be arranged between the hinge pin and the impact bar and between the buffer top and the impact bar to reduce wear on the hinge pin and to shorten the load path during impact.

For example, a first bronze bearing can surround the hinge pin and interface between the hinge pin and the slotted hole of the impact bar. The first bronze bearing can have flat side surfaces that slide along the flat surfaces of the slotted hole and increase a sliding surface area to reduce wear. The first bronze bearing can also have rounded side surfaces that substantially match the curvature of the ends of the slotted hole. A retaining cap can be secured to an end of the hinge pin using a retaining pin to keep the first bronze bushing and hinge pin in place within the slotted hole. A second bronze bearing can have a rounded or curved inner surface and a flat outer surface and be arranged between the impact bar and a top of the impact buffer. The second bronze bearing can be arranged within a recessed portion of the impact bar. The flat surface preferably contacts the impact bar and provides a sliding surface contact while the rounded or curved surface preferably contacts and matches a curved top surface of the impact buffer. The second bronze bearing preferably shortens the load path between the impact bar and the impact buffer, permitting an impact force to go directly from the impact bar into the buffer eye.

According to another aspect of the present inventive concepts, an impact sensing system can be provided to detect impacts to the sides of the vehicle. In one embodiment, an impact sensor, such as an induction sensor or other longitudinal distance or force sensor, is arranged in the impact protective structure to detect movement of the impact bar. Upon inward movement of the impact bar (e.g., as a result of impact), the sensor detects the movement and triggers an impact alert and an appropriate response from the vehicle control system.

In one embodiment, once the sensor triggers an impact alert, the vehicle responds with a "drive-inhibit" function that substantially immediately removes full torque from the traction motor to prevent any further damage due to continued impact with the colliding object. For instance, if the side of a vehicle impacts an object such as a stack of containers or other items, the torque can be substantially immediately removed to prevent the truck from continuing to push against the obstacles. This can be particularly important for larger trucks where impacts might not be felt by the operator.

A manual override option can be provided to allow an operator to continue driving after an impact has triggered the drive-inhibit function. The manual override can, for instance, be a button located inside the cab that must be continuously pressed by the operator to drive the vehicle back to a service station. The override button preferably only permits driving while the button is pressed and does not reset the impact alert or the drive-inhibit function. It permits the driver to drive away from danger such as falling objects or unstable stacks, but requires a dealer or service personnel to reset the function after evaluating the damage from impact and making any necessary repairs.

According to another aspect of the present inventive concepts, the impact frame can further provide a structure for retrofitting existing vehicles with additional automation features, such as laser sensing, LIDAR, etc. Automation features can, for example, be added to the impact frame as a kit and then retrofitted onto the vehicle.

Additional aspects and advantages will be apparent from the following detailed description of example embodiments, which proceeds with reference to the accompanying drawings.

BRIEF DESCRIPTION OF THE DRAWINGS

The foregoing and additional objects, features, and advantages of the present inventive concepts will become more readily apparent from the following detailed description of preferred embodiments, depicted in the attached drawings, in which.

DETAILED DESCRIPTION OF EMBODIMENTS

Figure 1:
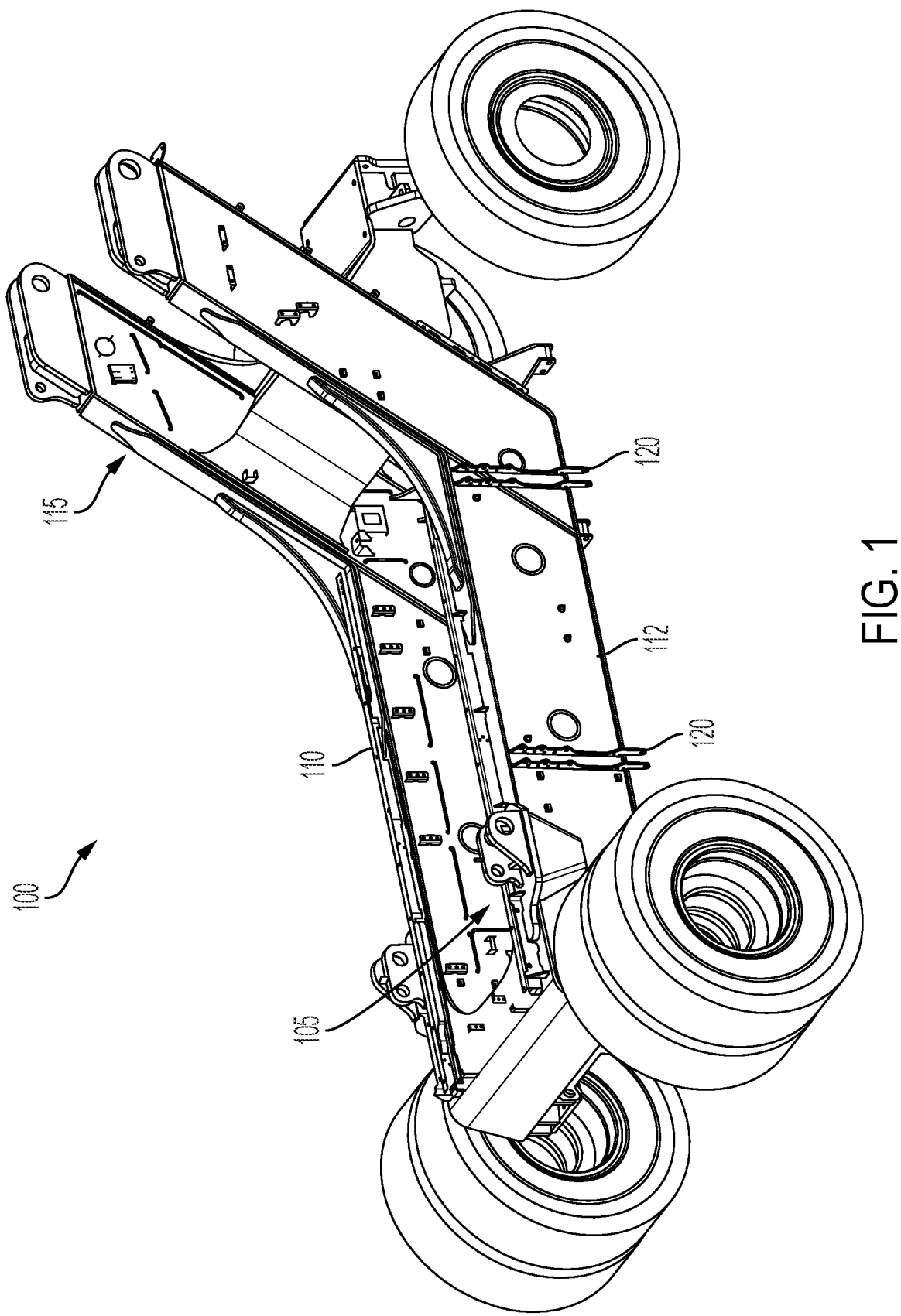
FIG. 1 is an isometric illustration of a frame for a conventional internal combustion engine reach truck including brackets arranged along longitudinal frame members.
Figure 2:
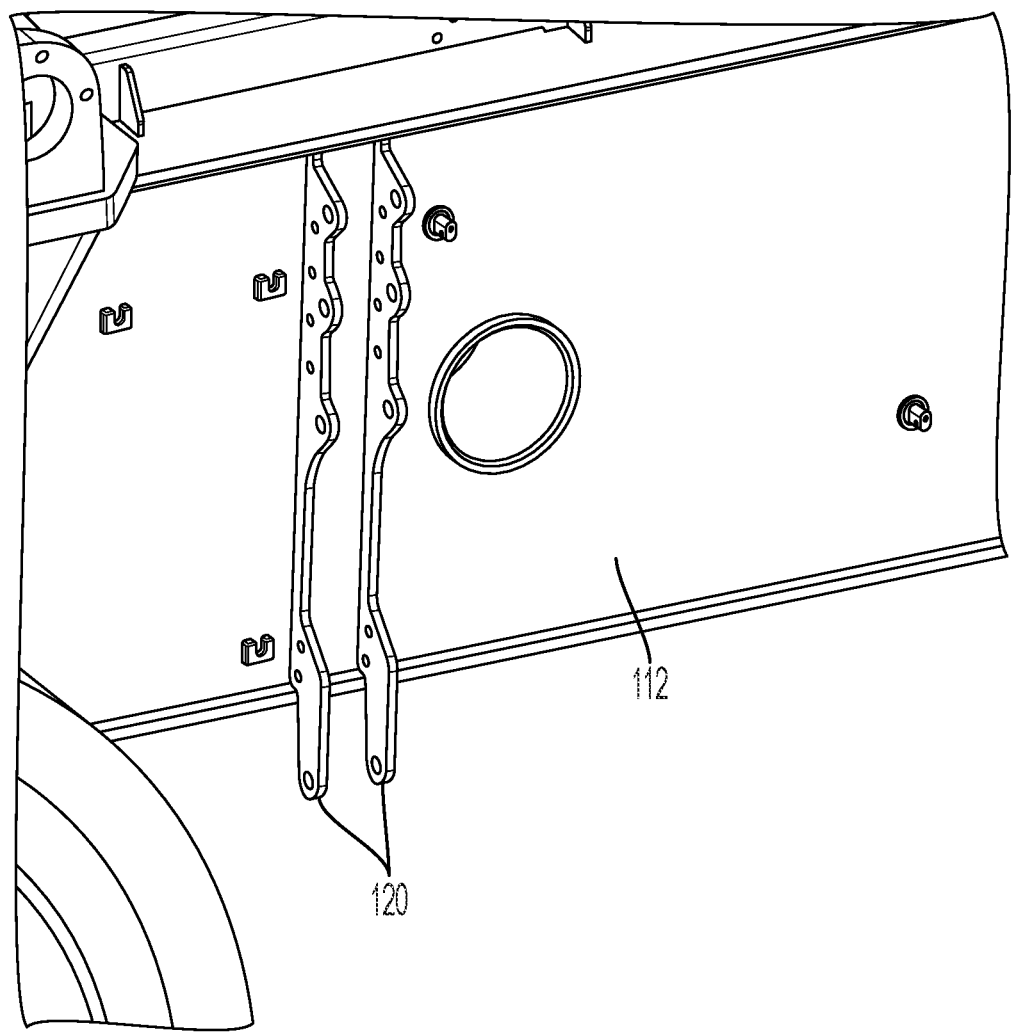
FIG. 2 is a close-up view of the brackets arranged along the frame of FIG. 1.
Figure 3:
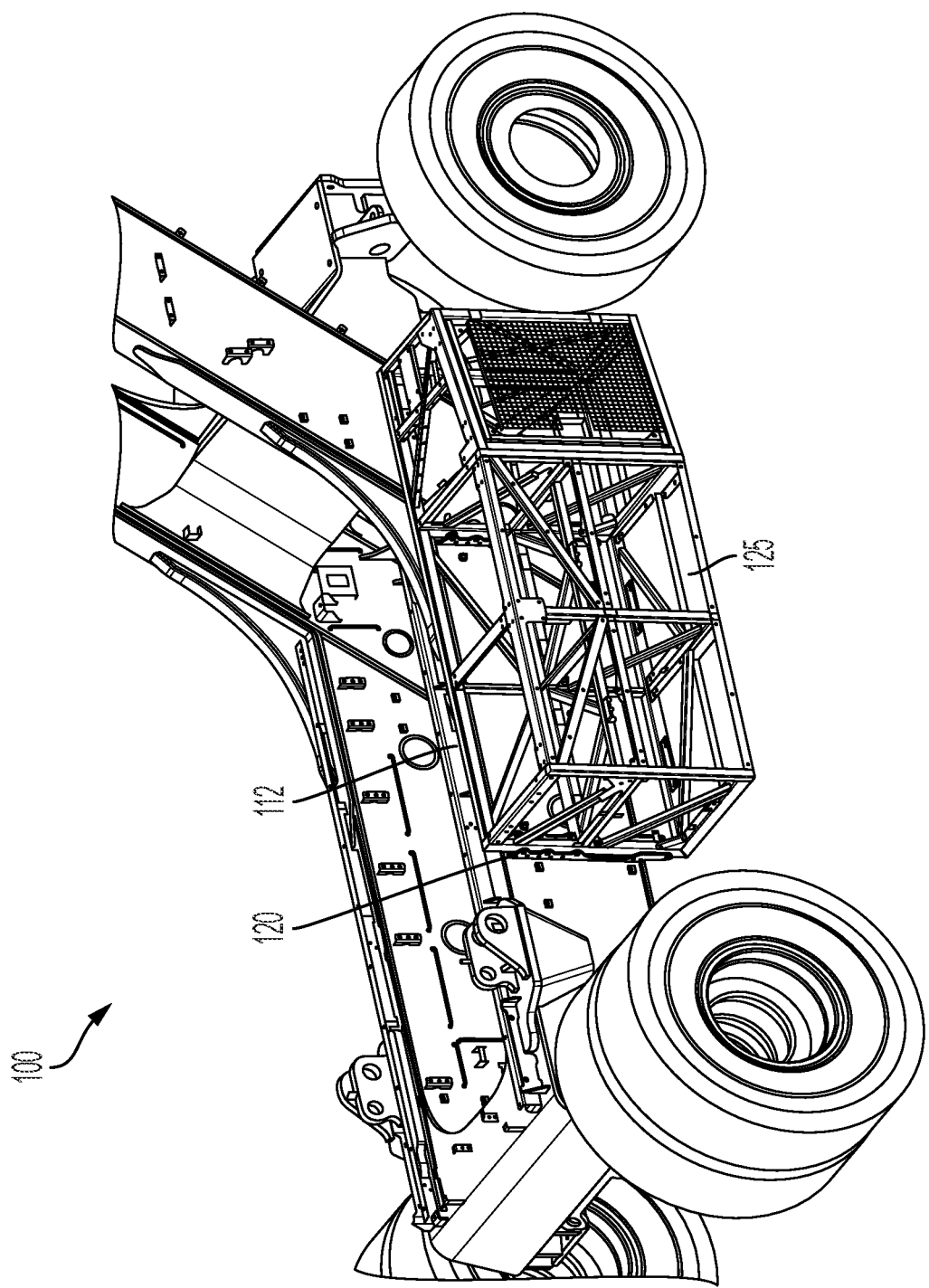
FIG. 3 is an isometric illustration of the frame of FIG. 1 having modular frames attached to the brackets.
Figure 4:
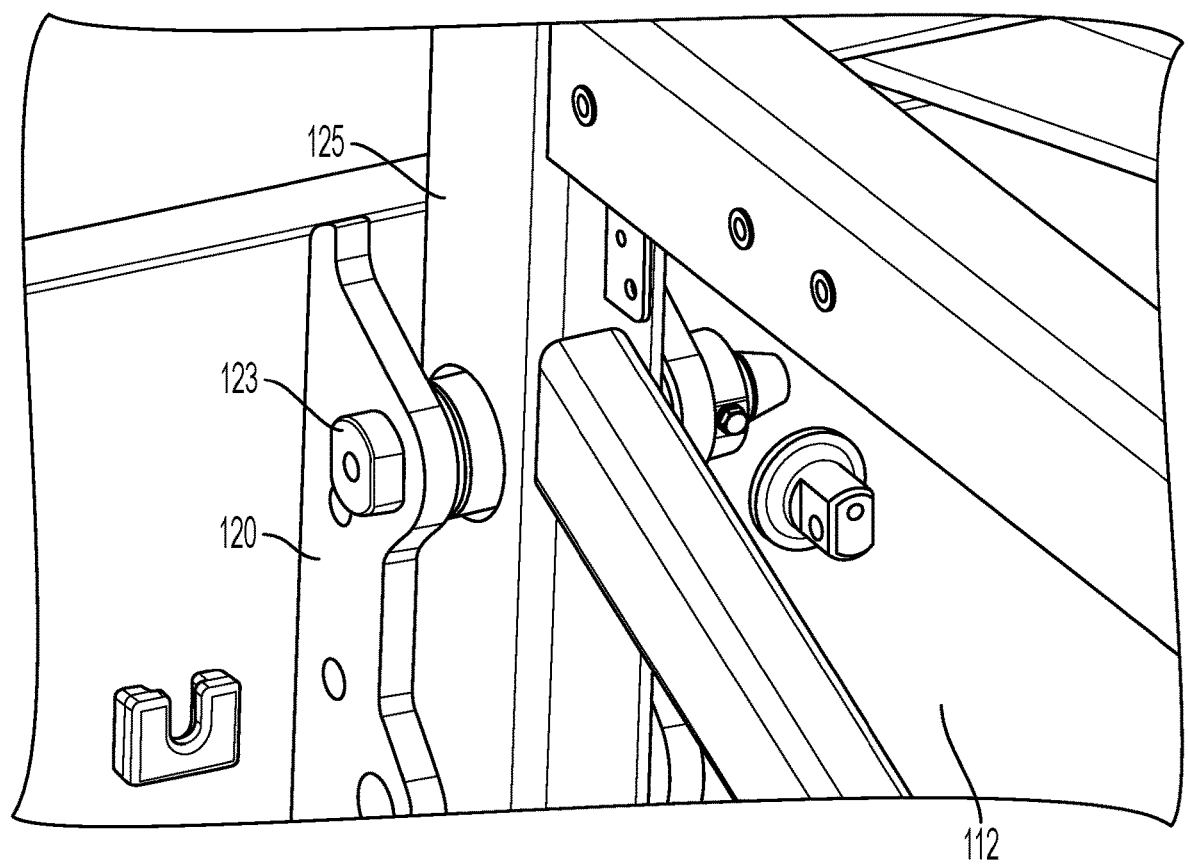
FIG. 4 is a close-up view showing a connection between the bracket and the modular frame.
Figure 5:
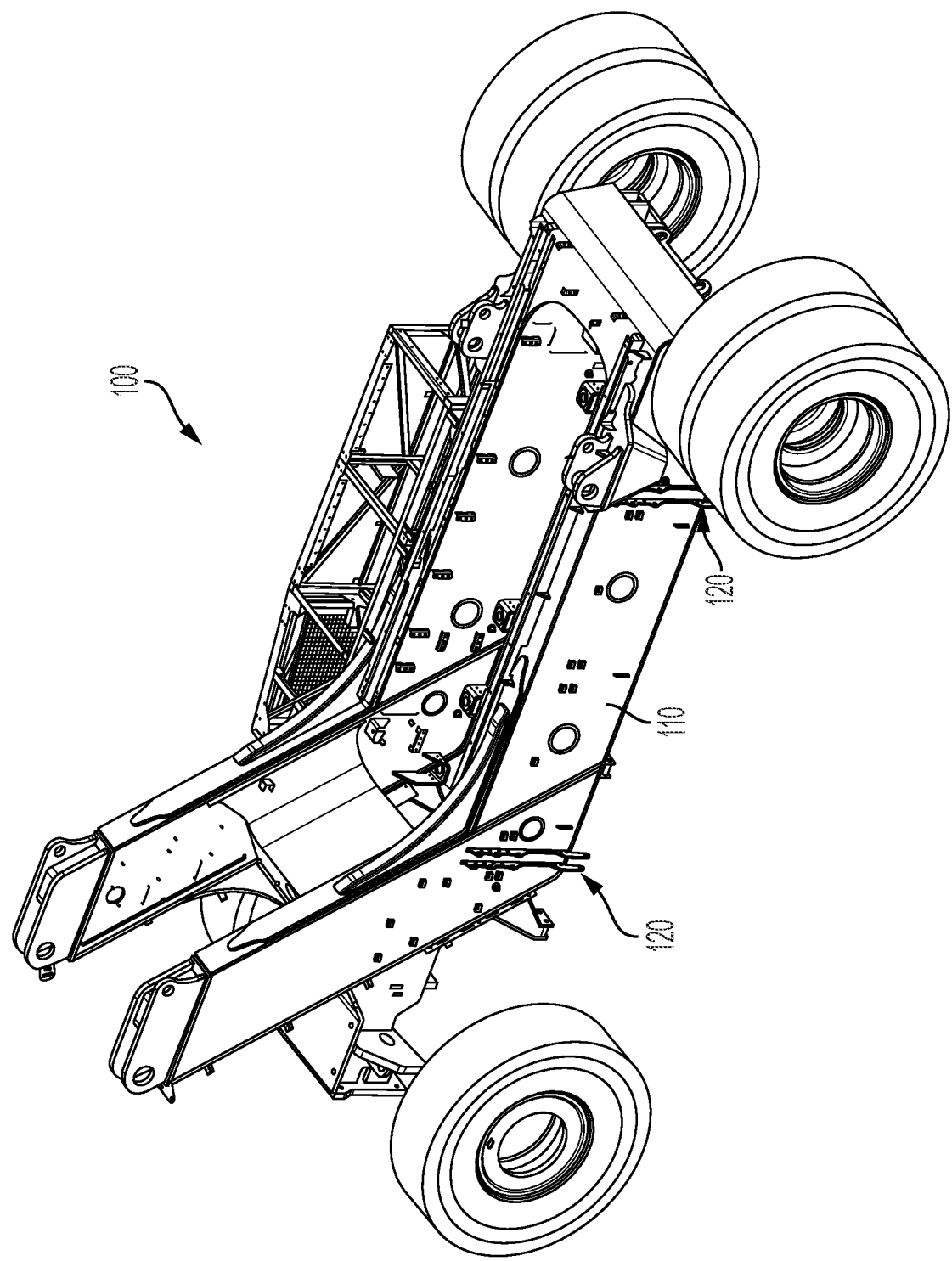
FIG. 5 is an isometric illustration of the vehicle frame of FIG. 3, further illustrating brackets arranged on an opposite side of the vehicle frame.
Figure 6:
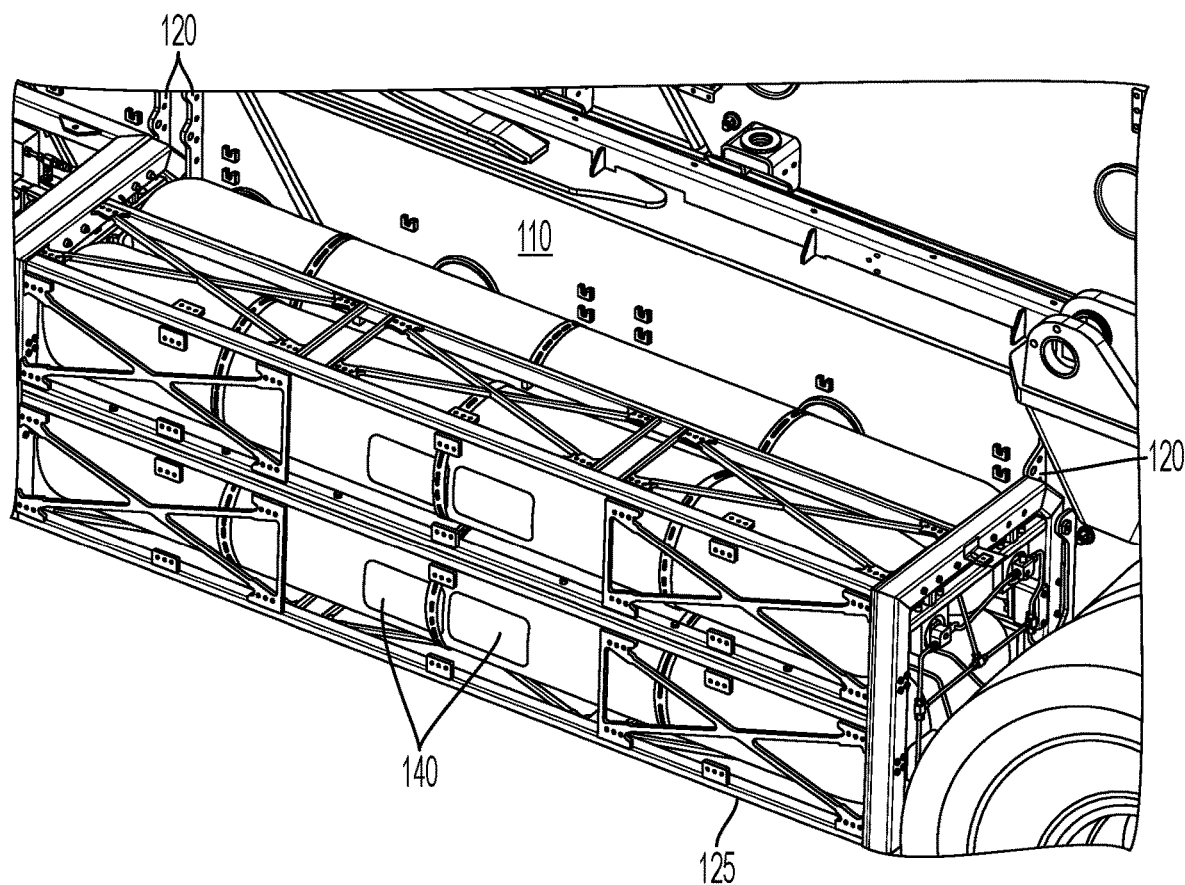
FIG. 6 is an isometric illustration of modular frames including hydrogen storage tanks connected to the brackets arranged on the opposite side of the vehicle frame of FIG. 5.
Figure 7:
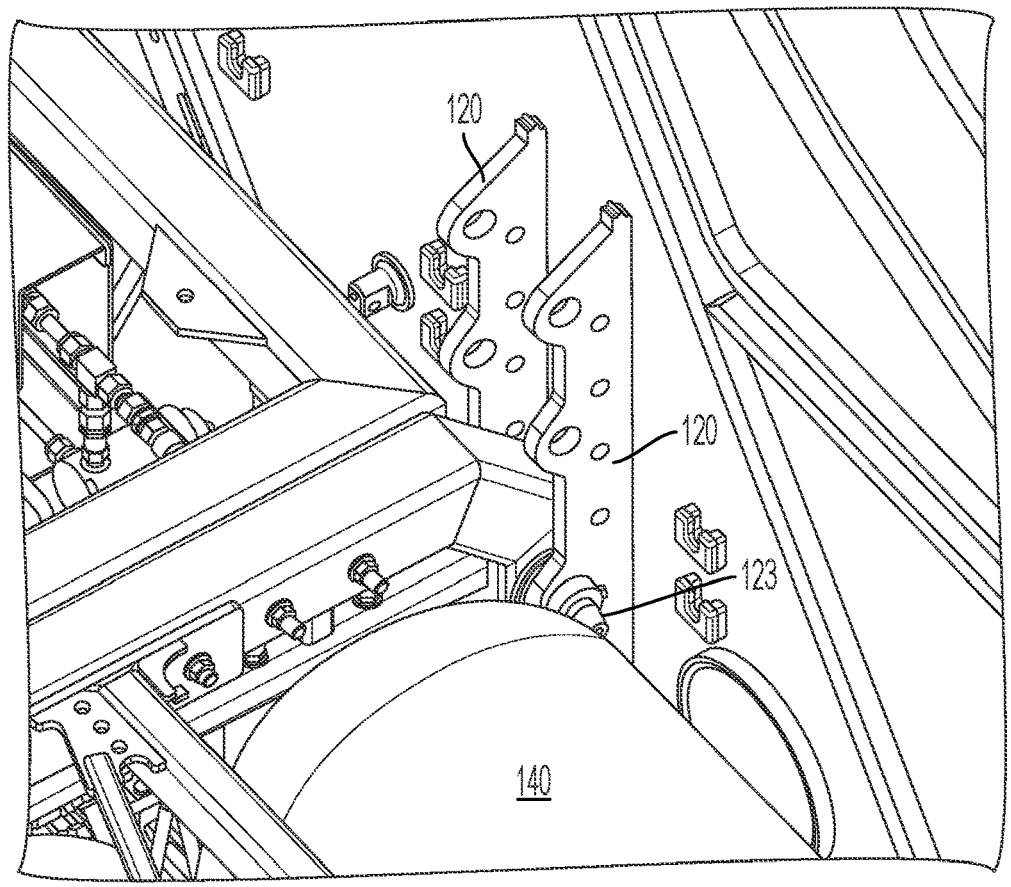
FIGS. 7 and 8 are close-up views illustrating an attachment between the modular frames and the brackets of FIG. 6.
Figure 8:
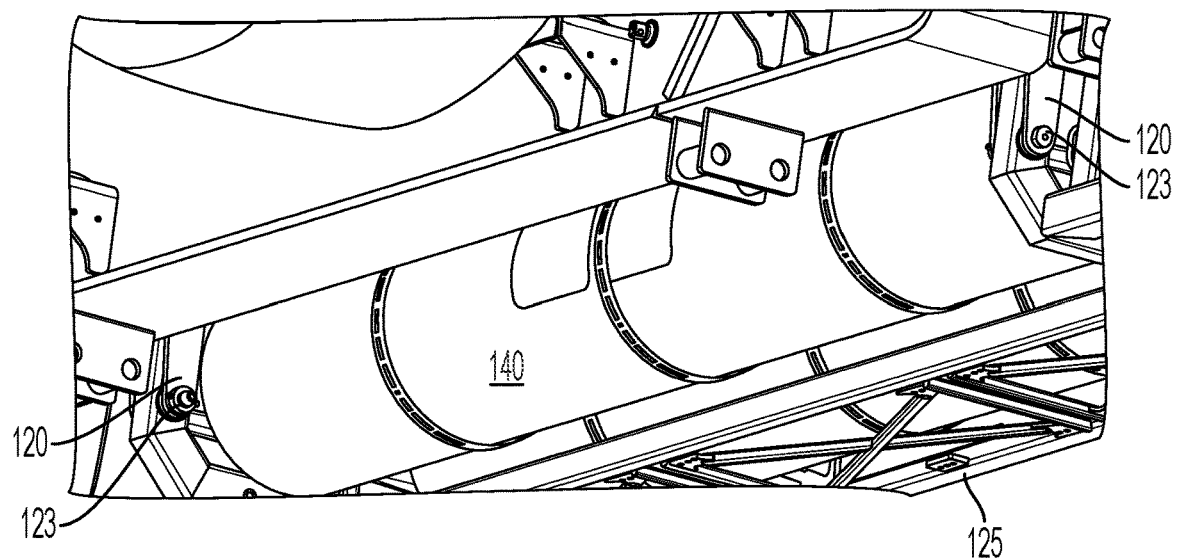

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete and will convey the scope of the disclosure to those skilled in the art.

FIGS. 1-12 illustrate a fuel-cell vehicle 100 in various stages of construction having modular components arranged along a conventional frame 115 for an internal-combustion-engine reach truck. Referring to FIGS. 1-12, a fuel-cell vehicle 100 includes a fuel cell and $H_2$ storage system having a modular buildup. The vehicle's conventional reach truck frame 115 can accommodate one or more hydrogen fuel cells 130, one or more hydrogen cylinders 140, an electric drive train (not shown), Li-Ion batteries (not shown), a DC/DC inverter 131 to boost fuel cell voltage to battery voltage, and other components provided in a modular manner. The electric drive train (not shown) of the vehicle 100 is preferably arranged in the space 105 between longitudinal side frames 110 and 112 of the main frame 115. Brackets 120 are attached to each of the side frames 110, 112 (preferably on the exterior sides of the side frames 110, 112) to receive the modular frames 125. The modular frames 125, 125A may be secured to the frame 115 before adding the battery (not shown), inverter 131, fuel cell 130, and/or hydrogen cylinder 140 components in the modular frames 125.

Of course, the components, like Li-ion batteries, inverter 131, a truck cooling manifold system 133, and other components, can be arranged in a modular frame 125 before the modular frame 125 is attached to the main frame 115. Similarly, hydrogen storage cylinders 140 and/or a hydrogen fuel cell 130 may be assembled into a modular frame 125 before, or after, the modular frame 125 is secured to the main frame 115. Using modular frames 125, any desired number (e.g., 4 to 6) of hydrogen storage tanks 140 or (e.g., 1 or 2) fuel cells 130 can, for example, be arranged along the frame 115 according to customer requirements, thereby optimizing truck cost for the given customer needs.

The use of modular frames 125 supports configurability for different application demands. For example, different combinations of fuel cells 130, hydrogen storage containers 140, cooling systems, batteries, etc., can be assembled into a vehicle 100 at a customer facility depending on the customer's needs, rather than being provided in a single preassembled configuration from the factory. Using modular frames 125 also makes it simple to upgrade/downgrade to higher/different configurations within a manufacturing facility or by dealers. For instance, an entire modular frame 125 could be easily removed from a truck and replaced with a new modular frame 125 containing upgraded or different components, or components could be removed or replaced within a modular frame 125 arranged on a vehicle 100. Additional modular frames 125A could also be added on to supplement or upgrade performance capabilities of the vehicle 100.

Moreover, with the modular system, use of the same integration parts 150 like tubing, cables, and radiators is facilitated and helps reduce costs by permitting higher parts volumes and lesser part numbers to maintain. The mechanical and electrical connections between the truck 100 and the components contained in a modular frame 125 can be made identical, or nearly identical, regardless of the components housed in a modular frame 125 which can lead to use of fewer parts across different truck configurations.

As shown in FIGS. 1-12, a fuel-cell vehicle 100 can comprise a main frame 115 having a space 105 between two longitudinal frame members 110, 112 that can receive an electric drive train assembly (not shown). Brackets 120 are attached to the longitudinal frame members 110, 112 of the main frame body 115. The brackets 120 support attachment of modular frame members 125. Each modular frame member 125 accommodates one or more separate components, such as Li-ion batteries (not shown), a DC/DC inverter 131, an EMC filter box 132, a truck cooling manifold system 133, and other components. Support members 135 (illustrated in FIG. 12) can be provided to attach the internal components to the modular frame 125. A truck cooling manifold 133 can provide cooling for the truck 100. Additional DC/DC inverter components 134 can also be included within the modular frame member 125. The modular frame members 125 can also accommodate a hydrogen storage cylinder 140 and/or a hydrogen fuel cell 130. The entire modular frame 125 can be removed from the brackets 120 and replaced with a new modular frame 125 having different components depending on customer desires. The same integrated parts 150 (like tubing, cables and radiators) can be used in the vehicle 100 regardless of the components in the modular frames 125 and thereby helps to use fewer parts across different vehicle configurations.

Figure 9:
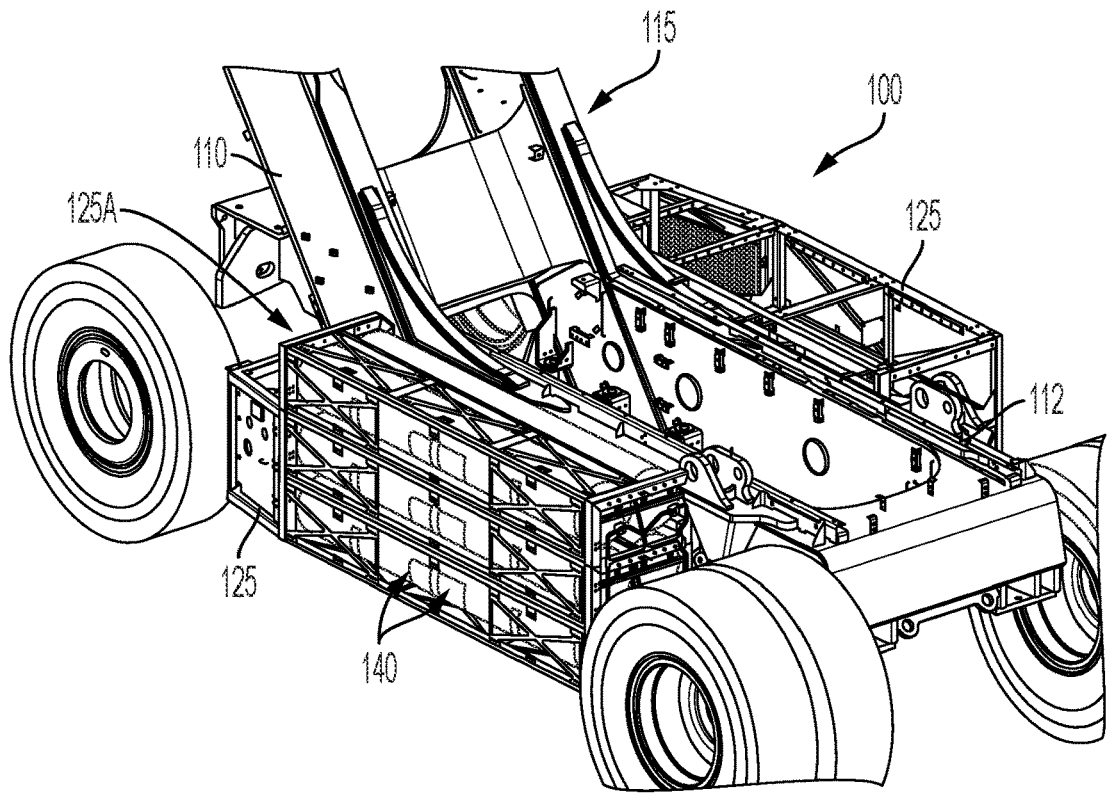
FIG. 9 is an isometric illustration of an additional modular frame added to the modular frames of FIG. 6 to provide additional hydrogen storage tanks.
Figure 10:
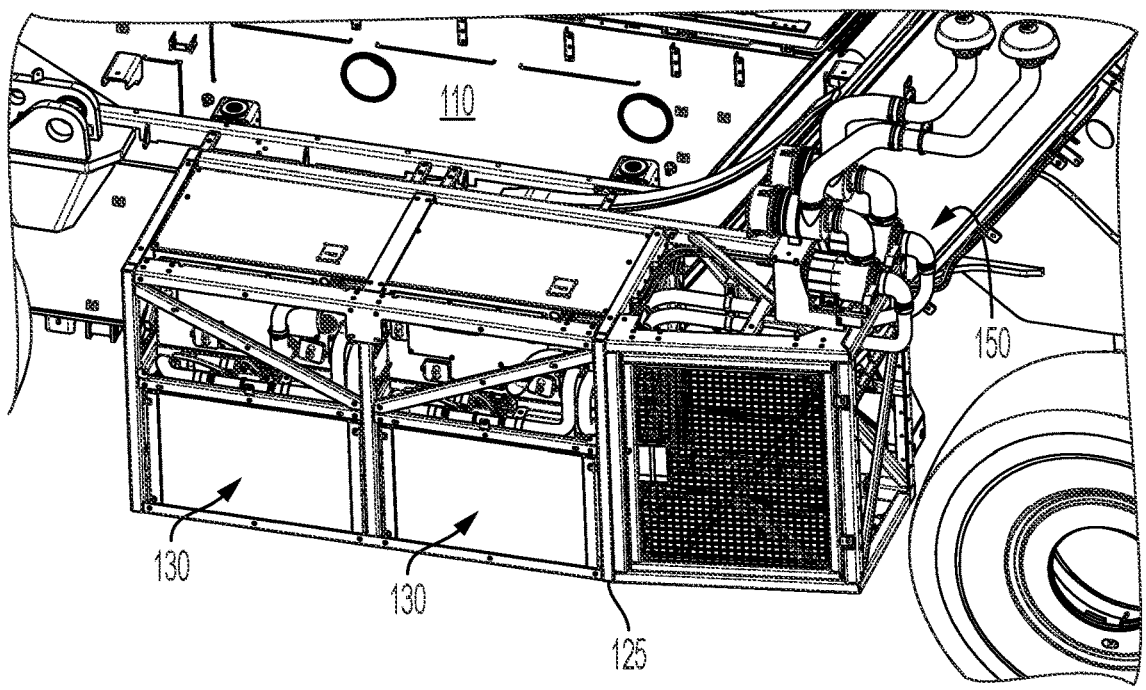
FIG. 10 is an isometric illustration of the modular frames of FIG. 3 including fuel cells for a fuel-cell vehicle.
Figure 11:
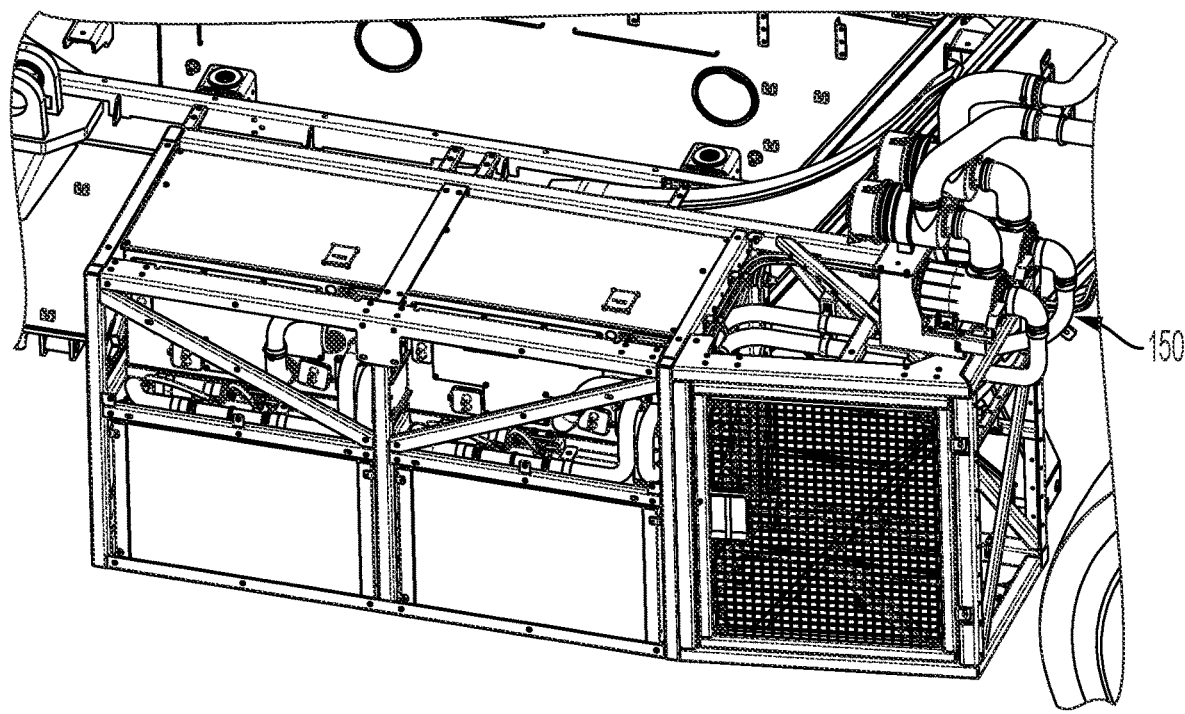
FIG. 11 is a close-up view of the fuel cells of FIG. 10.
Figure 12:
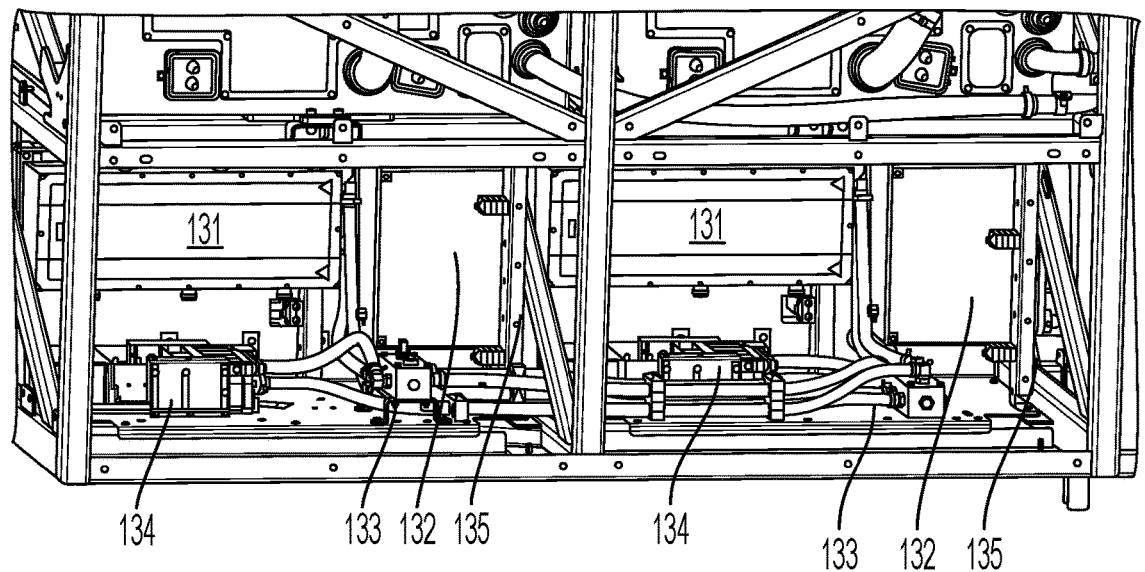
FIG. 12 is a rear view of the modular fuel cells of FIG. 10, further illustrating the components and connections of the modular fuel cell systems.

Customers can therefore select a desired combination of fuel cells 130, hydrogen storage tanks 140, batteries, and related components based on their specific needs. The truck 100 can either be supplied with the desired components by the factory or dealer using a modular assembly, or the customer can easily provide the vehicle 100 with the desired components on-site. Additionally, the configuration of fuel cell 130, battery, and hydrogen storage tank 140 components can be readily modified by the customer as needs change. Referring specifically to FIG. 9, for example, additional hydrogen tanks 140 can be provided in an add-on modular frame 125A to increase the hydrogen storage capacity of the vehicle 100.

Accordingly, a vehicle 100 can use modular and standard interfaces to equip a conventional frame 115 for a reach stacker vehicle 100 with fuel cell components. The electric drive train components (electric motor, etc.) can be arranged in the space 105 between the longitudinal frame members 110 and 112 of the main frame 115. To accommodate the hydrogen fuel cell 130, hydrogen cylinders 140, Li-Ion batteries (not shown), and DC/DC inverter 131, brackets 120 are secured to the frame 115 so that modular frames 125 can be added to the main frame 115.

A modular frame 125 may be pinned into the brackets 120 using pin-and-lock connectors 123, nuts and bolts, or other desired mechanical connection members. The modular frame 125 may be secured to the main frame 115 via the brackets 120 before components are added to the modular frame 125. Alternatively, components, such as Li-ion batteries, a DC/DC inverter 131 and 134, an EMC filter box 132, and truck cooling manifolds 133 may be assembled into the modular frame 125 before the modular frame 125 is secured to the main frame 115. Similarly, hydrogen storage cylinders 140 and hydrogen fuel cells 130 may be assembled into modular frames 125 before, or after, the modular frame 125 is secured to the main frame 115.

The modular arrangement described above provides scalability of $H_2$ storage modules (e.g., four or six $H_2$ storage tanks) as well as scalability of fuel cell engines (e.g., one or two fuel cells) to meet different customer application demands and to optimize truck cost. The use of modular frames 125 further supports customer configurability for different application demands. For example, the desired components can be pre-assembled into a modular frame 125 to meet a particular customer demand before being provided for customer assembly into a vehicle 100 at their own facility. Therefore, different combinations of fuel cells 130, hydrogen storage containers 140, EMC filter boxes 132, cooling systems 133, batteries, inverters 131, etc., can be custom assembled off of the vehicle 100 into modular frames 125 to meet the specific configurations ordered by customers instead of directly assembling such components onto the main frame 115 at the factory where the vehicle 100 is produced. Those modular frames 125 can then be shipped to the customer for assembly into the vehicle 100.

Using modular frames 125 also makes upgrading to higher/different configuration within a customer facility or by dealers simple. An entire modular frame 125 could be removed from a truck and replaced with a new modular frame 125 containing upgraded or different components. Alternatively, parts within a modular frame 125 could be removed and/or replaced or additional modular frames 125A could be added.

As explained above, the use of the same integration parts 150 (like tubing, cables, radiators, etc.) also leads to less expensive assemblies by providing higher parts volumes and fewer part numbers to maintain. In other words, by making the mechanical and electrical connections to the truck 100 from the components contained in a modular frame 125 identical, or nearly identical, regardless of the type or configuration of components in the modular frame 125, fewer parts can be used across different truck configurations.

While the use of modular frames 125, as described above, makes more efficient use of vehicle space, it results in expensive vehicle components (e.g., fuel cells and hydrogen storage tanks) being arranged outside of the main frame 115 of the vehicle 100. These expensive components are therefore exposed to potential impact damage from collisions to the sides of the vehicle 100.

Figure 13A:
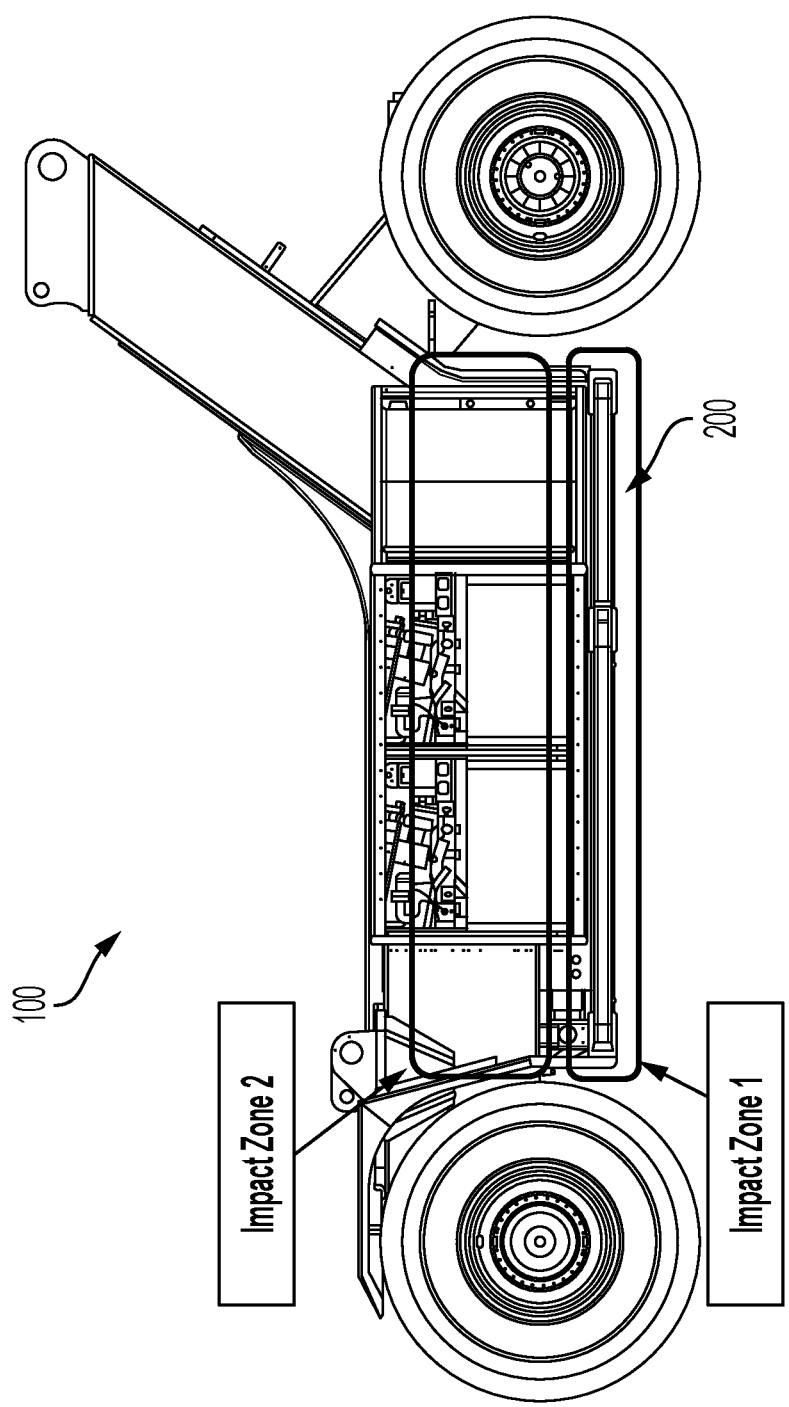
FIG. 13A is a side view of a fuel cell vehicle frame and externally mounted modular components further fitted with an impact protective structure according to principles of the present inventive concepts and illustrating impact zones requiring different forms of impact protection.
Figure 13B:
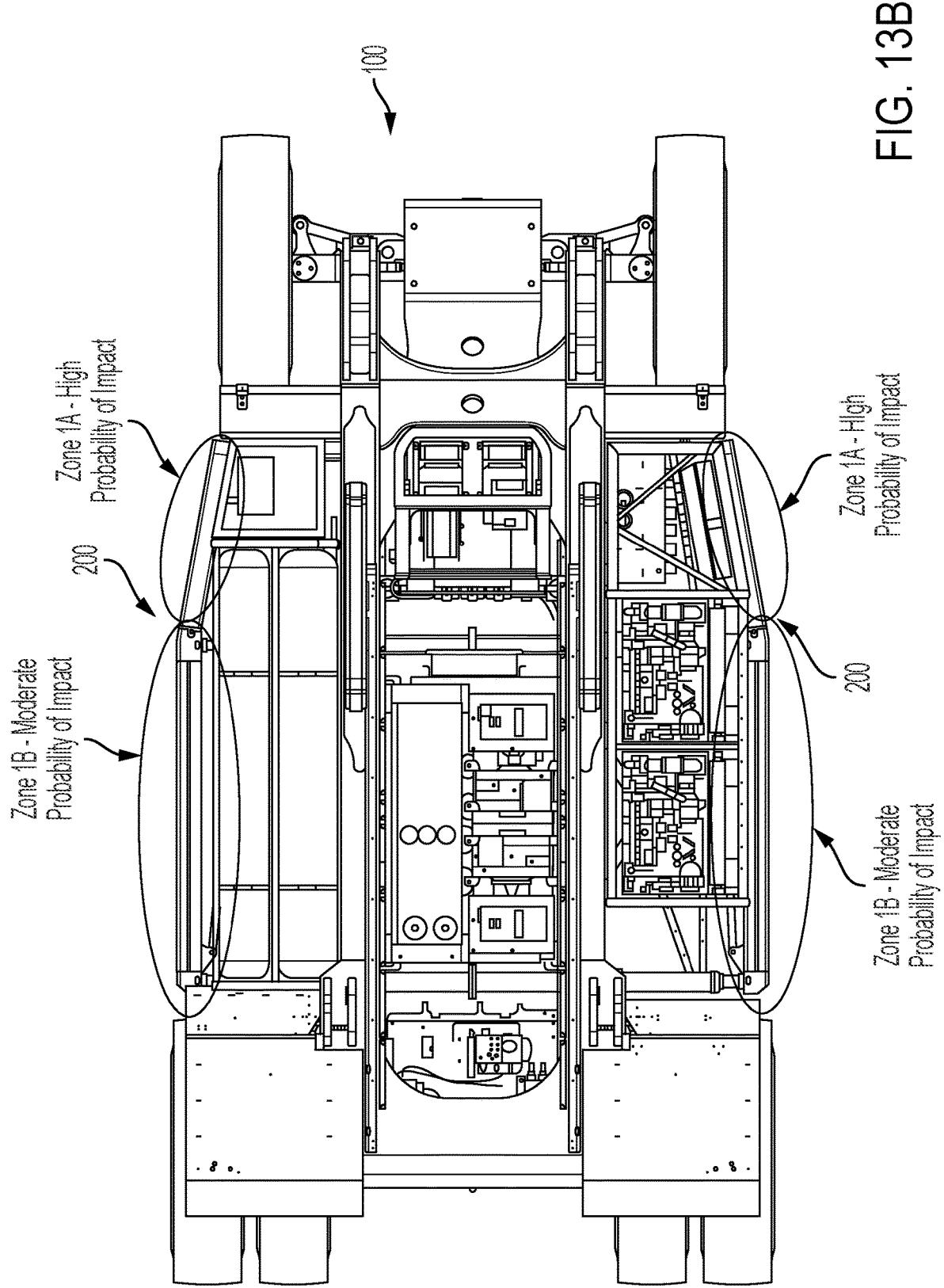
FIG. 13B is a top view of the fuel cell vehicle frame and impact protective structure of FIG. 13A, further illustrating potential impact zones.
Figure 13C:
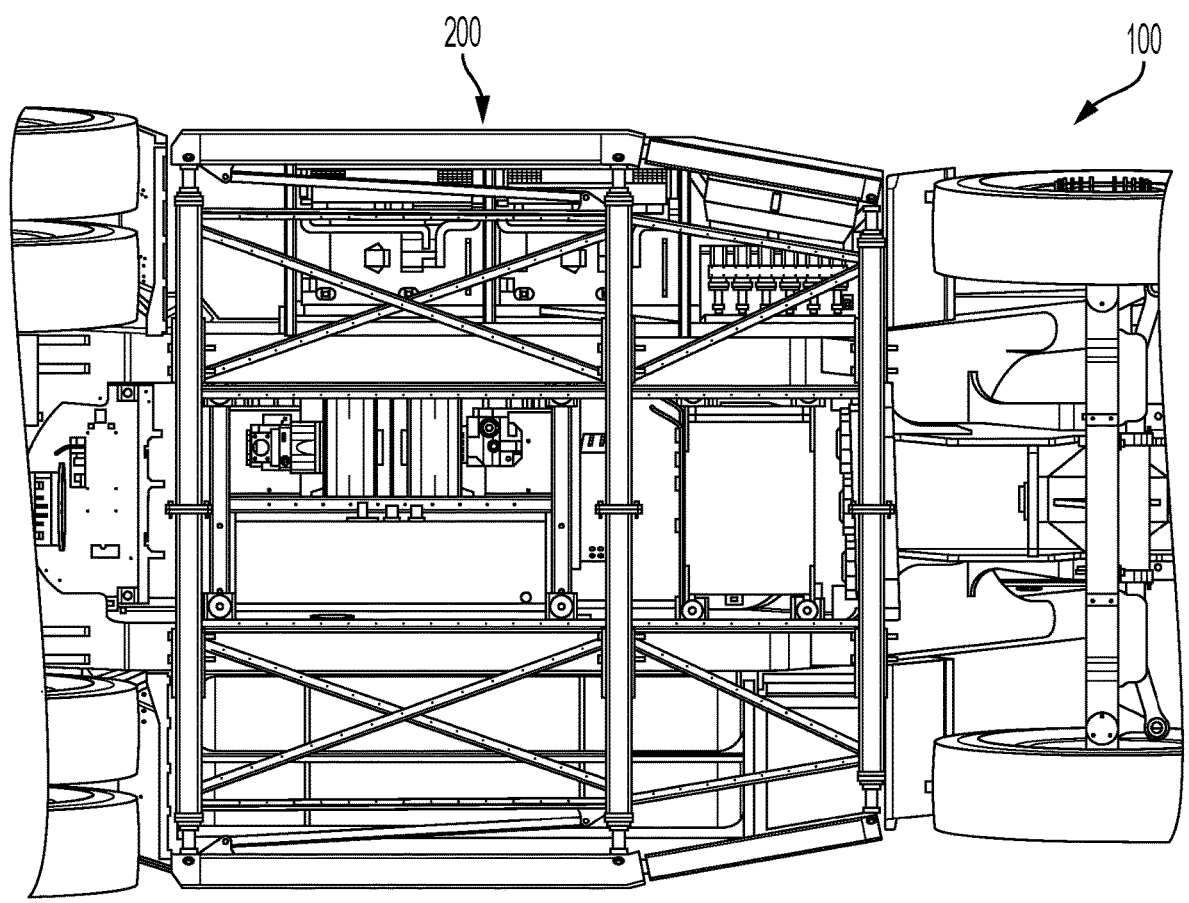
FIG. 13C is a bottom view of the fuel cell vehicle with impact protective structure of FIG. 13A.
Figure 14A:
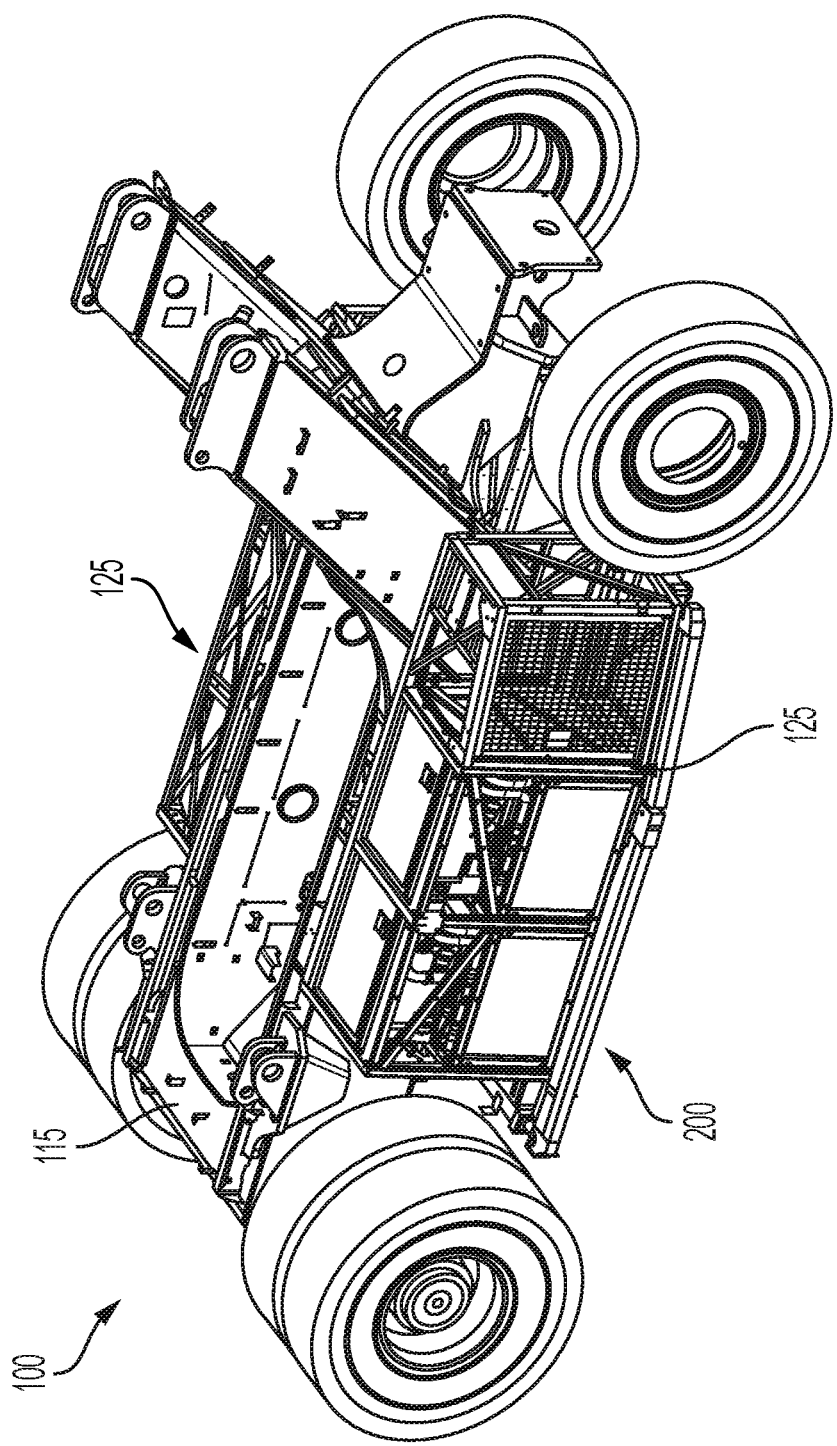
FIG. 14A is an isometric illustration of a fuel cell vehicle frame and external modular components further fitted with an impact protective structure according to principles of the present inventive concepts.
Figure 14B:
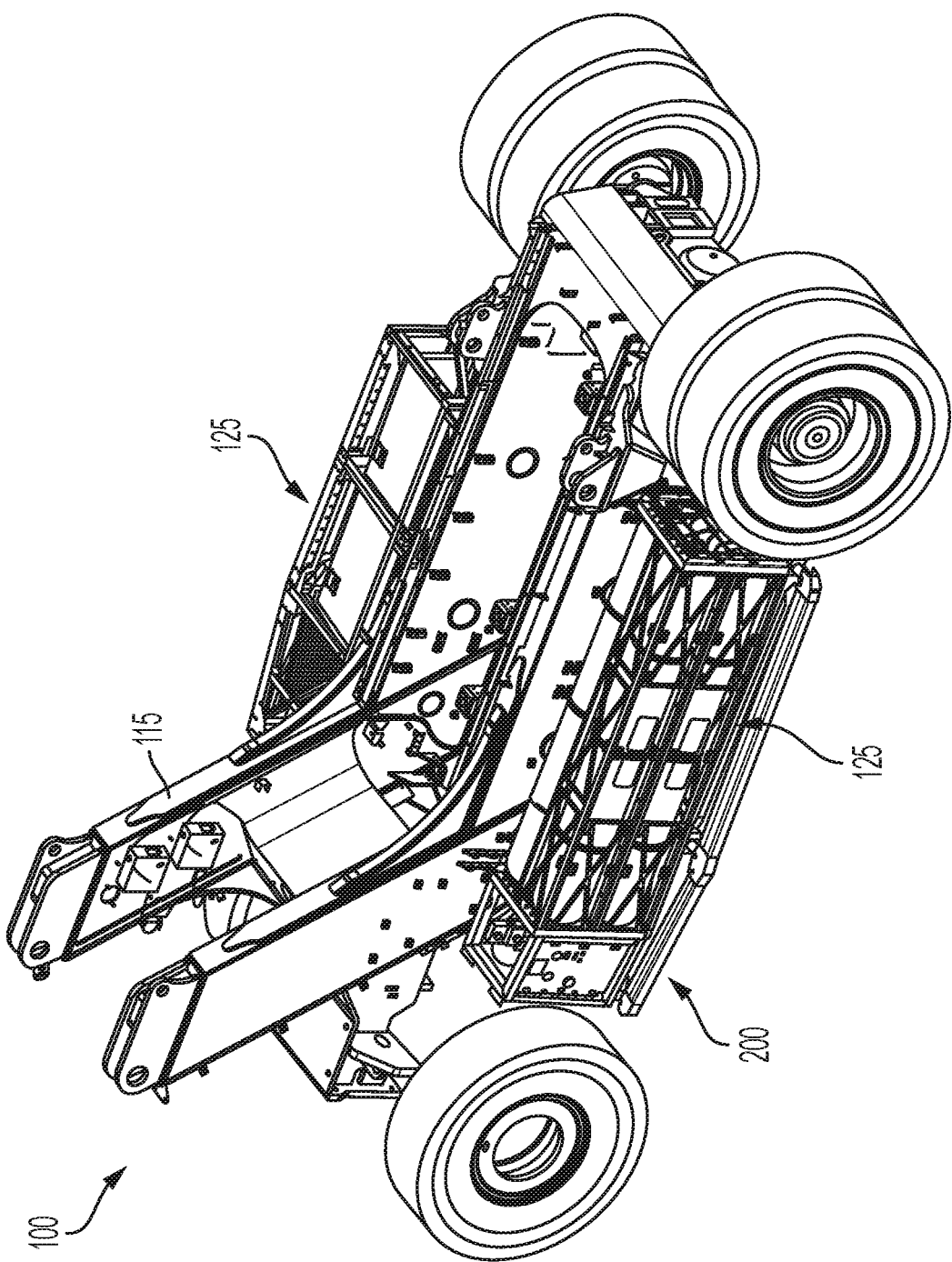
FIG. 14B is an opposite side isometric illustration of the fuel cell vehicle frame and external modular components of FIG. 14A.
Figure 15:
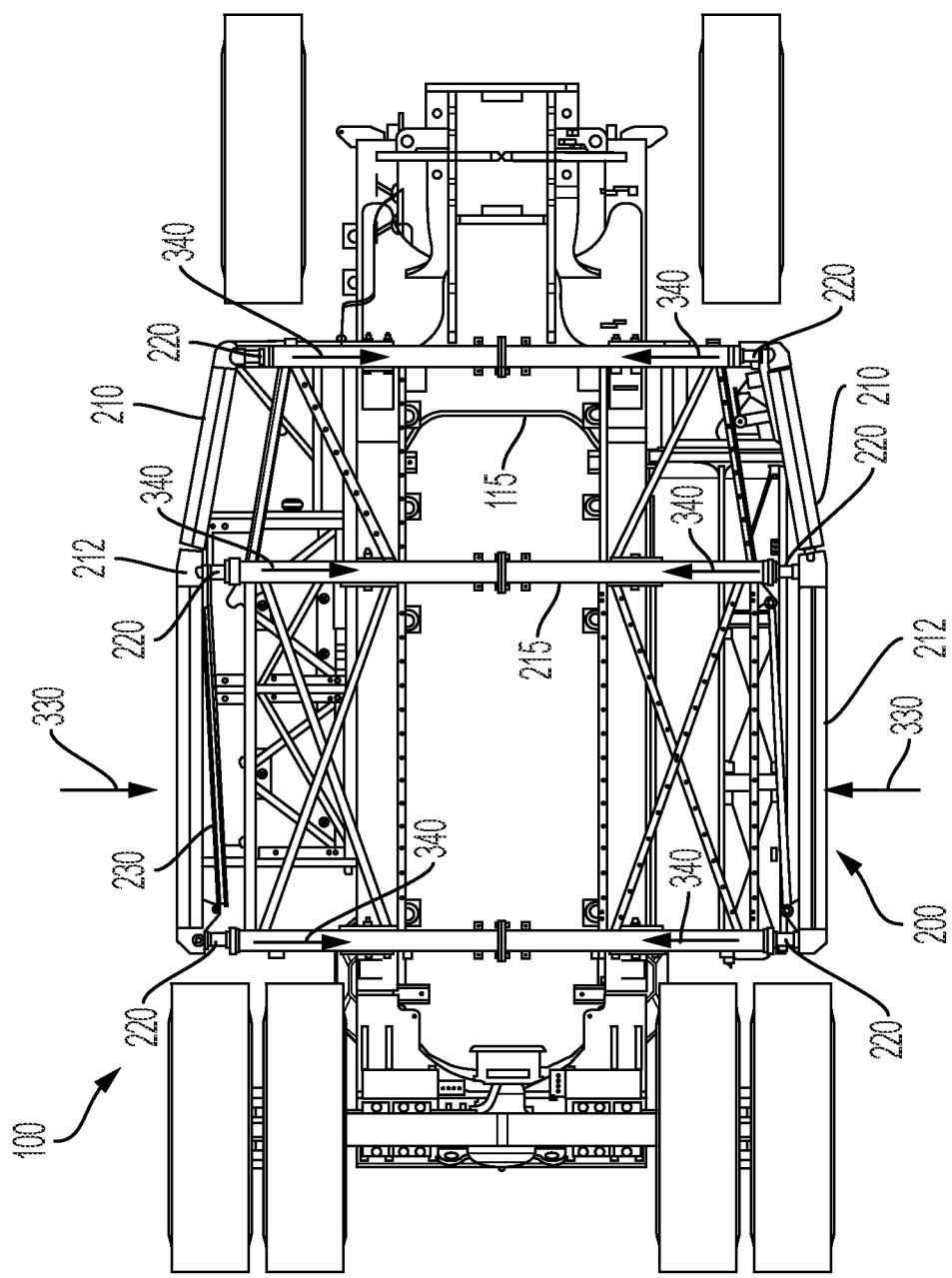
FIG. 15 is a bottom plan view of the fuel cell vehicle frame and external modular components of FIGS. 13 and 14.
Figure 16:
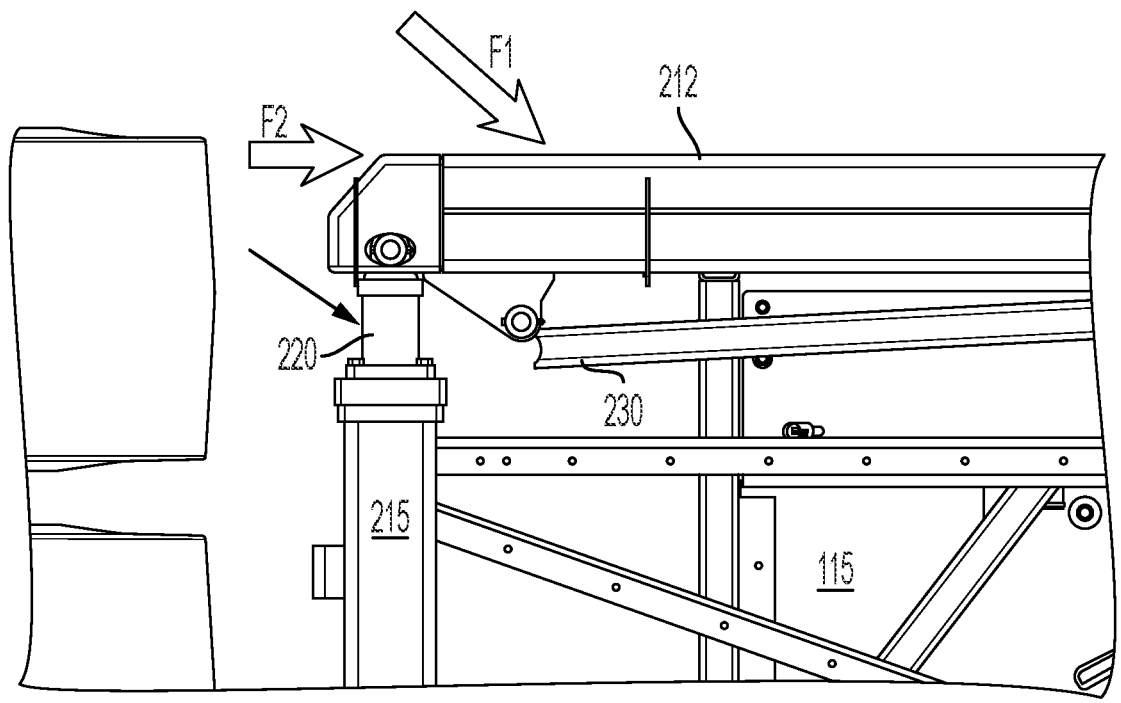
FIG. 16 is a close-up view of an impact buffer and impact bar connection of the impact protective structure of FIG. 15.

FIGS. 13A-25 provide various illustrations of an impact protective structure 200 for a materials-handling vehicle 100 along with methods for using an impact sensing system to control vehicle operation according to principles of the present inventive concepts. Referring first to FIGS. 13A and 13B, various impact protection strategies and mechanisms can be used to prevent different impact positions and conditions based on the likelihood of impact and the likely cause of impact.

Referring first to FIGS. 13A-13B, Impact Zone 1 is of primary concern with respect to the principles of the present inventive concepts. Impacts in Impact Zone 1 are likely to occur during operation of the materials-handling vehicle such as when turning the vehicle or driving backwards. Ideally, impact forces between approximately about 10 metric Tonnes (mT) to 25 mT of force should cause no more than 50 mm to 100 mm of deformation to the impact protective structure. While plastic deformation of an impact bumper and even some permanent bumper damage is acceptable, the impact should do no damage to the externally mounted critical components such as $H_2$ tanks and fuel cell engines. The highest probability of impact is in Zone 1A, with moderate probability in Zone 1B.

Other driving vehicles may also impact the materials-handling vehicle and those impacts can occur in Impact Zone 2. Impact Zone 2 can, for instance, be protected by aluminum plates arranged around the $H_2$ tanks and other externally mounted fuel cell components.

Referring now to FIGS. 13A-23, according to principles of the present inventive concepts, an impact protective structure 200 is attached to the vehicle main frame 115 to protect vehicle components located along the sides of the vehicle outside of the vehicle's main frame 115 from impacts in Zone 1. The impact protective structure 200 preferably includes one or more impact bars (or bumpers) 210, 212 arranged along an outside of the vehicle 100 and one or more impact buffers 220 connecting the impact bars 210, 212 to an impact frame 215. The impact frame 215 can be rigidly or semi-rigidly connected to the vehicle frame 115. One or more reaction arms 230 can also be provided to transfer non-axial side impact forces (loads) F1 and F2 into the impact frame 215 and ensure that the buffers 220 only receive axial forces.

The outer impact bars 210, 212, impact buffers 220, and reaction arms 230 are preferably the only components of the impact protective structure 200 that move appreciably in relation to the vehicle frame 115. The impact frame 215 itself is preferably rigidly or semi-rigidly connected to the vehicle frame 115. As specifically illustrated in FIG. 19, for instance, brackets 216, 115a can be used to connect the impact frame 215 to the vehicle frame 115 with bolts 217a arranged to connect impact frame brackets 216 with vehicle frame brackets 115a. In one embodiment, the bolts 217a are provided with plastic (or other elastic or semi-elastic material) bushings 217b arranged between mounting holes on the vehicle frame bracket 115a and the bolts/pins 217a connecting it to the impact frame bracket 216. The brackets 216, 115a can, for example, be welded to the respective frames 215, 115 or they can be formed integrally with those frames 215, 115. The bushings 217b allow some elastic movement of the vehicle frame 115 (i.e., due to loadings) without substantially displacing the impact frame 215. They also help prevent stress from bumper impacts from affecting the vehicle frame 115.

Figure 18A:
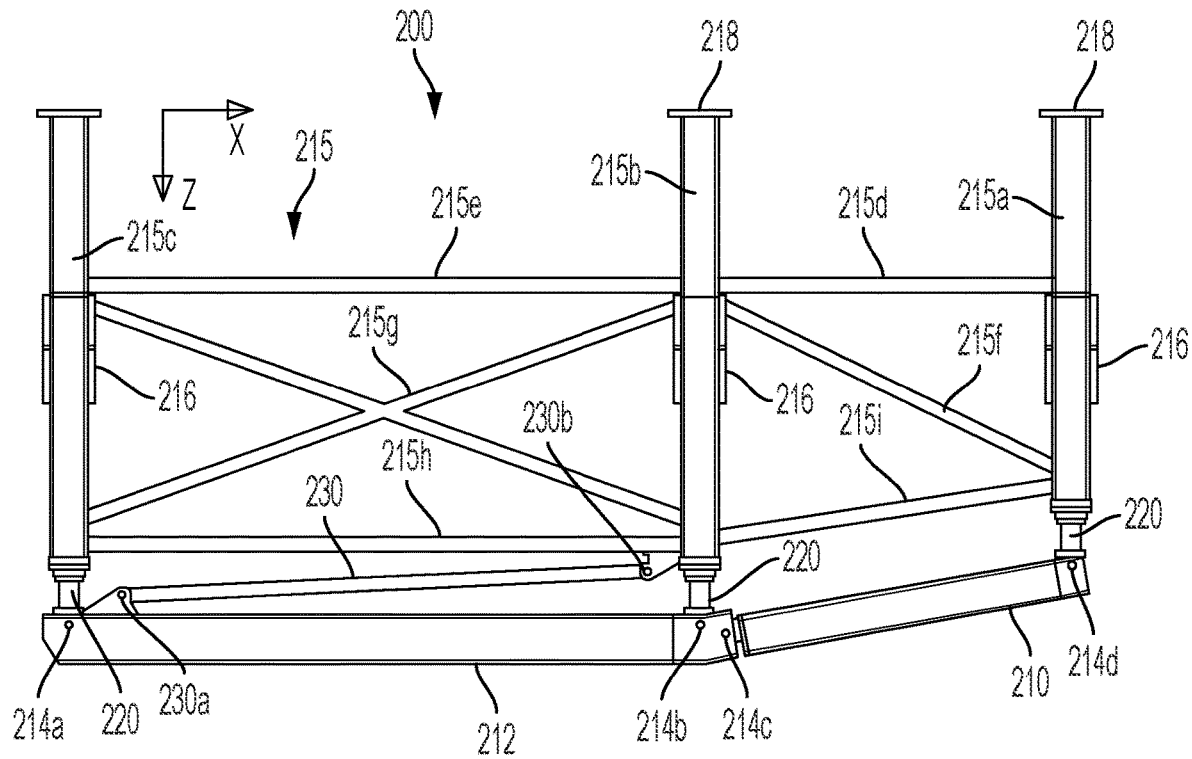
FIG. 18A is a top plan view of one half of an impact protective structure according to principles of the present inventive concepts.
Figure 18B:
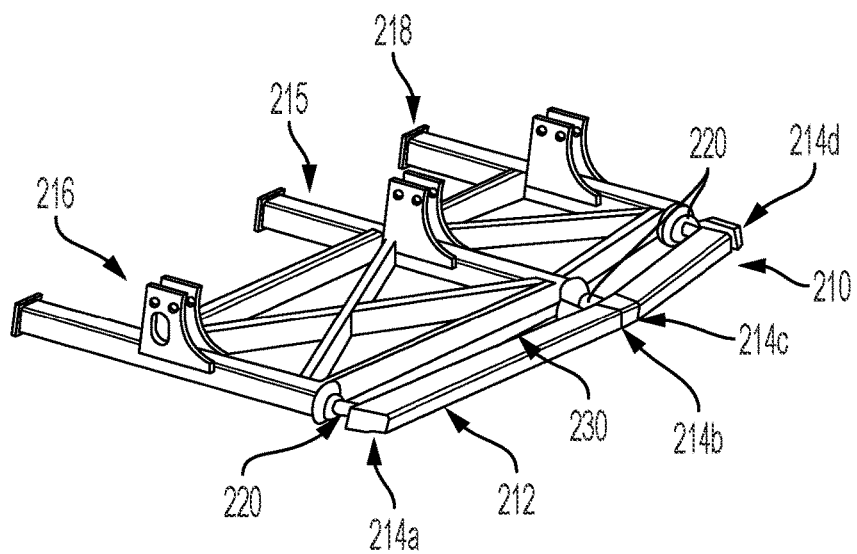
FIG. 18B is an isometric view of the impact protective structure of FIG. 18A.
Figure 19:
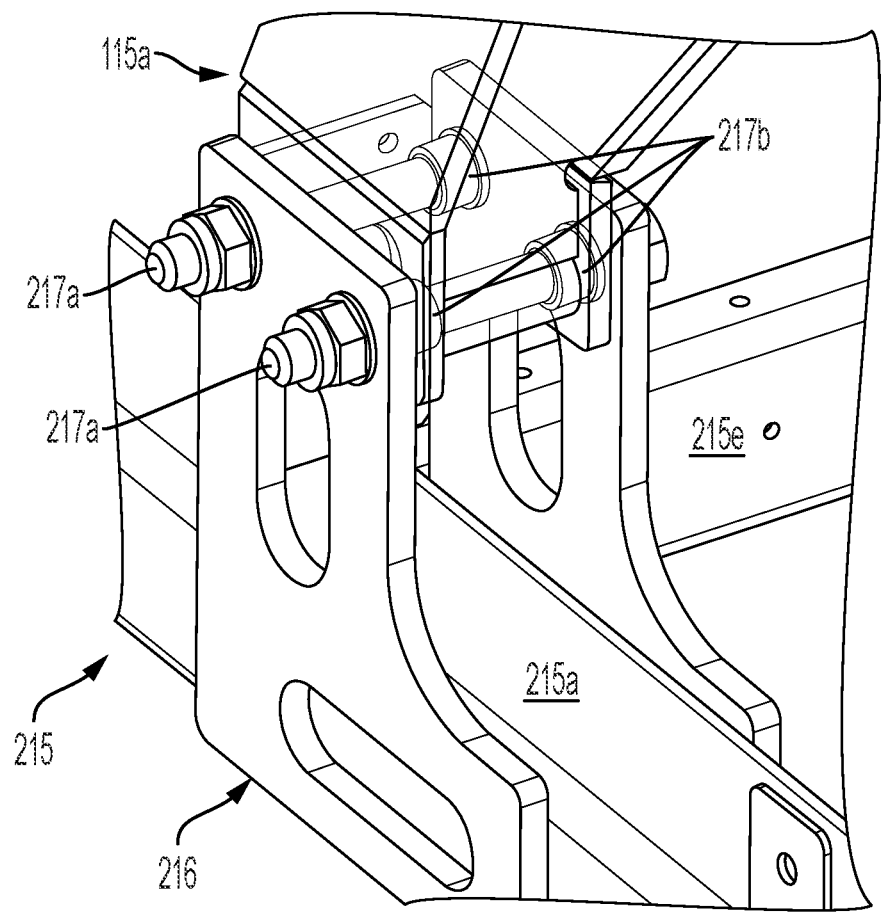
FIG. 19 is an isometric view of a connection between an impact frame of the impact protective structure and a vehicle frame according to still further principles of the present inventive concepts.

Referring now specifically to FIGS. 18A and 18B, the impact protective structure 200 can include two impact frames 215 (one shown) connected together at connection plates 218 by any desirable mechanical connection such as bolts, welding, etc. The impact frame 215 can include main bars 215a, b, and c connected together using cross bars 215d, e, h, and i, and truss bars 215g and f. Impact buffers 220 are secured to the main bars 215a-c. The impact bars 210, 212 are connected to the main bars 215a, b, and c through the impact buffers 220 using hinged connections 214a, b, and d. The impact bars 210, 212 are also connected together using a hinged connection 214c. The hinged connections 214a-d permit relative rotational movement between the impact bars 210, 212 and the impact buffers and between the impact bars 210, 212 themselves. A reaction arm 230 is preferably provided between the impact bar 212 and the impact frame 215 with hinged connection points 230a, 230b to absorb side impact forces on the impact bar 212 and ensure that only linear forces are directed into the impact buffers 220. Connection brackets 216 are provided to connect the impact frame 215 to the vehicle frame 115.

Figure 20:
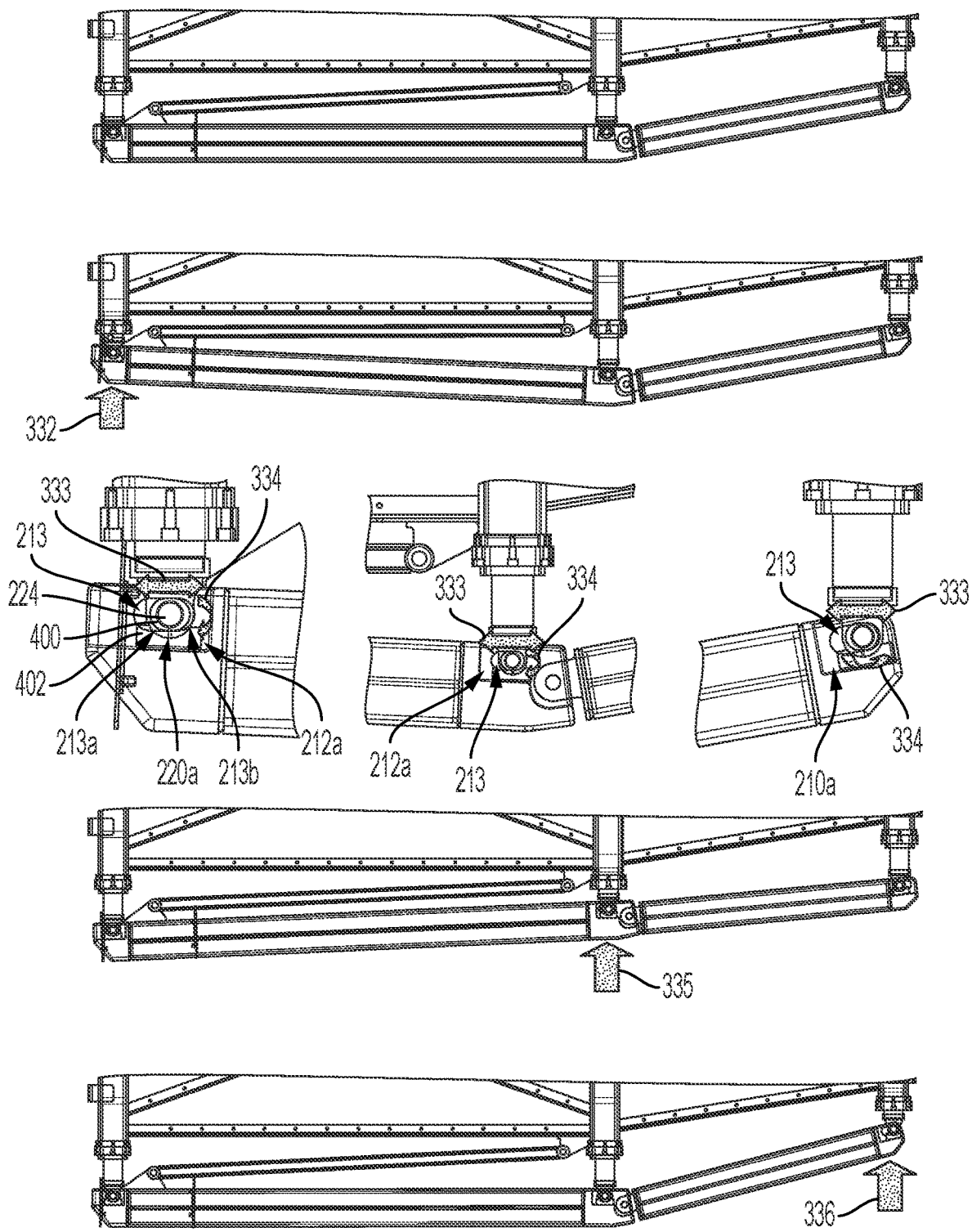
FIG. 20 provides various sectional top views of an impact protective structure, illustrating movement of the impact bars and impact buffers under different impact conditions.
Figure 21:
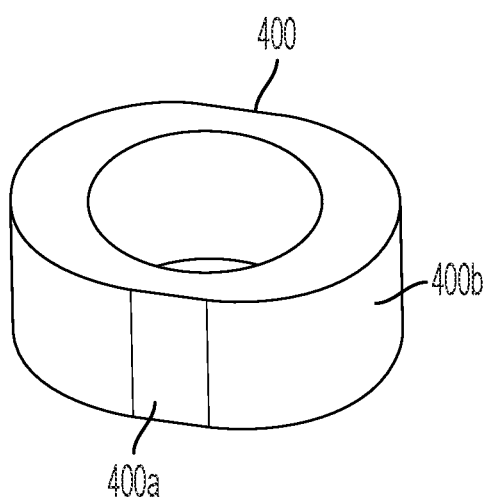
FIG. 21 is an isometric illustration of a bronze bearing used in a connection mechanism between an impact buffer and an impact bar.
Figure 22:
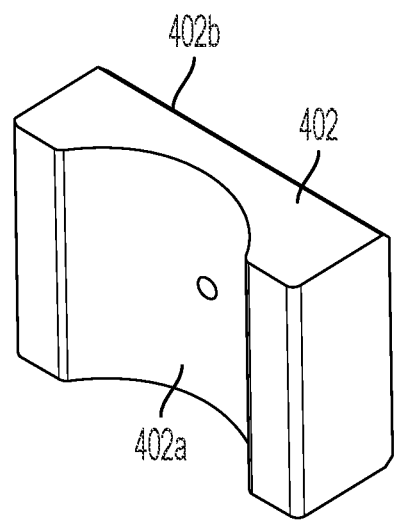
FIG. 22 is an isometric illustration of a bronze bearing used to shorten a load path between an impact bar and an impact buffer.

The impact bars 210, 212 can, for example, be made from S355 bended U-plates that are welded together. The impact bars 210, 212 preferably provide high bending resistance. Referring additionally to FIG. 20, the impact bars 210, 212 can be connected to the impact buffers 220 using hinge pins 224. The hinge pins 224 can be arranged in a slotted hole 213 formed through the impact bar 210, 212, respectively, to provide for both rotational movement (represented by arrow 334) and side to side movement (represented by arrow 333) of the impact bar at the connection points between the impact bar 210, 212 and to the impact buffer 220. The hinged connection points 214a-d, along with the slotted connections, permit an impact force (i.e., represented by arrows F1, F2, 330, 332, 335, 336) to compress one or more impact buffers 220 and increase the distance between buffers 220 without stressing or deforming the contact points between the impact bars 210, 212 and buffers 220. Bronze (or other material) bearings 400, 402 can further be arranged between the hinge pin 224 and the impact bar 210, 212 and between a top 220a of the impact buffer 220 and the impact bar 210, 212 to reduce wear on the hinge pin 224 and to shorten the load path during impact.

Referring specifically to FIGS. 20-23, for example, a first bronze bearing 400 can surround the hinge pin 224 and interface between the hinge pin 224 and the slotted hole 213 of the impact bar 210, 212. The first bronze bearing 400 can have flat side surfaces 400a that slide along the flat surfaces 213a of the slotted hole 210a, 212a, 212b and increase a sliding surface area to reduce wear. The first bronze bearing 400 can also have rounded side surfaces 400b that substantially match the curvature of the ends 213b of the slotted hole 213. A retaining cap 226 can be secured to an end of the hinge pin 224 using a retaining pin 228 to keep the first bronze bushing 400 and hinge pin 224 in place within the slotted hole 213.

A second bronze bearing 402 can have a rounded or curved inner surface 402a and a flat outer surface 402b and be arranged between the impact bar 210, 212 and a top 220a of the impact buffer 220. The second bronze bearing 402 can be arranged within a recessed portion 210a, 212a of the impact bar 210, 212. The flat surface 402b preferably contacts the impact bar 210, 212 and provides a sliding surface contact while the rounded or curved surface 402a preferably contacts and matches a curved top surface 220a of the impact buffer 220. The second bronze bearing 402 preferably shortens the load path between the impact bar 210, 212 and the impact buffer 220, permitting an impact force 332, 335, 336 to go directly from the impact bar 210, 212 into the buffer 220 (e.g., a buffer eye (not shown)).

Figure 23:
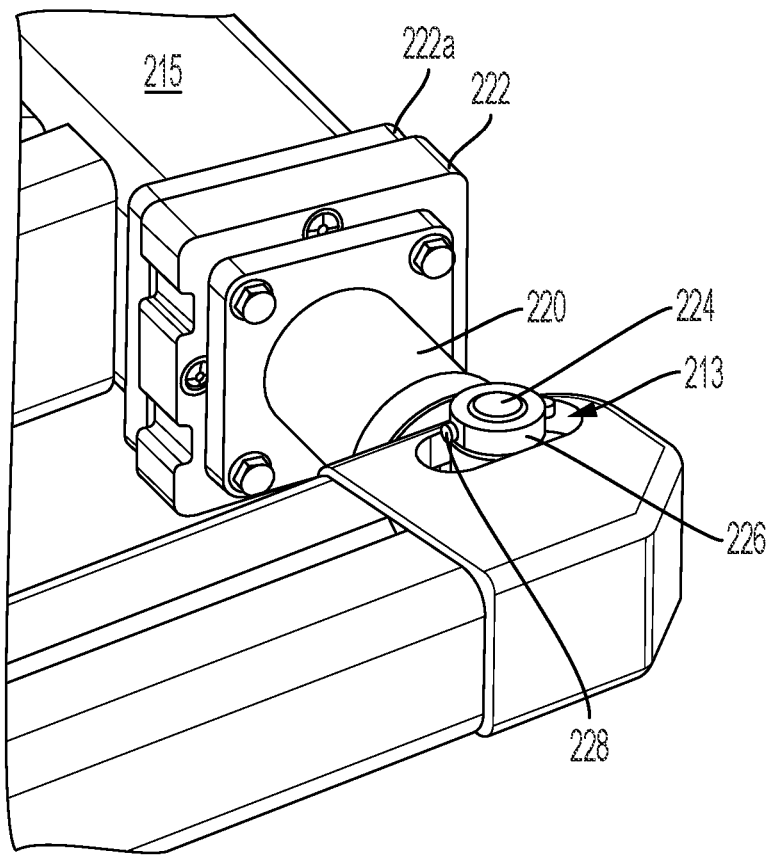
FIG. 23 is an isometric illustration showing connection mechanisms, including an adaptor plate, between the impact buffer and the impact frame and between the impact buffer and an impact bar, according to various embodiments of the present inventive concepts.

As further shown in FIG. 23, an adaptor plate 222 may be provided to connect a different size or style of buffer to the impact frame 215. In this case, the adaptor plate 222 is used to connect an Oleo buffer 220 to an ACE configured mounting plate 222a on the impact frame 215.

Referring again to FIGS. 13A-23, the impact buffers 220 are preferably designed to linearly absorb an impact force/energy (represented by arrows 330, 332, 335, 336) over a predetermined distance (e.g., 50-100 mm) in the energy dissipation direction (represented by arrows 340). Contrasted to other buffers, which require more (exponential)

force as the compression increases, the impact buffers 220 according to present inventive concepts move up to the predetermined maximum displacement distance (e.g., 100 mm) under a fixed, linear force. The impact buffers 220 are also preferably designed to slowly return to their original positions (extended outwards) once the impact force is removed, without the need for additional servicing or replacement. The impact buffers 220 can, for instance, be off-the-shelf buffers such as those provided by ACE Controls Inc. or Oleo Inc.

As mentioned previously, the outer impact bars 210, 212, reaction arms 230, and impact buffers 220 are the only components of the impact protective structure 200 that move appreciably in relation to the vehicle frame 115. Although a preferred connection mechanism has been described previously, the impact frame 215 can be rigidly or semi-rigidly connected to the vehicle frame 115 through any acceptable mechanical connection, such as nuts and bolts, welding, or other mechanical connection(s). The impact bars 210, 212 can be positioned in any desired height relative to the vehicle frame 115 to optimize the impact protective aspect of the design and adapt it to any type or size of vehicle 100.

Figure 17:
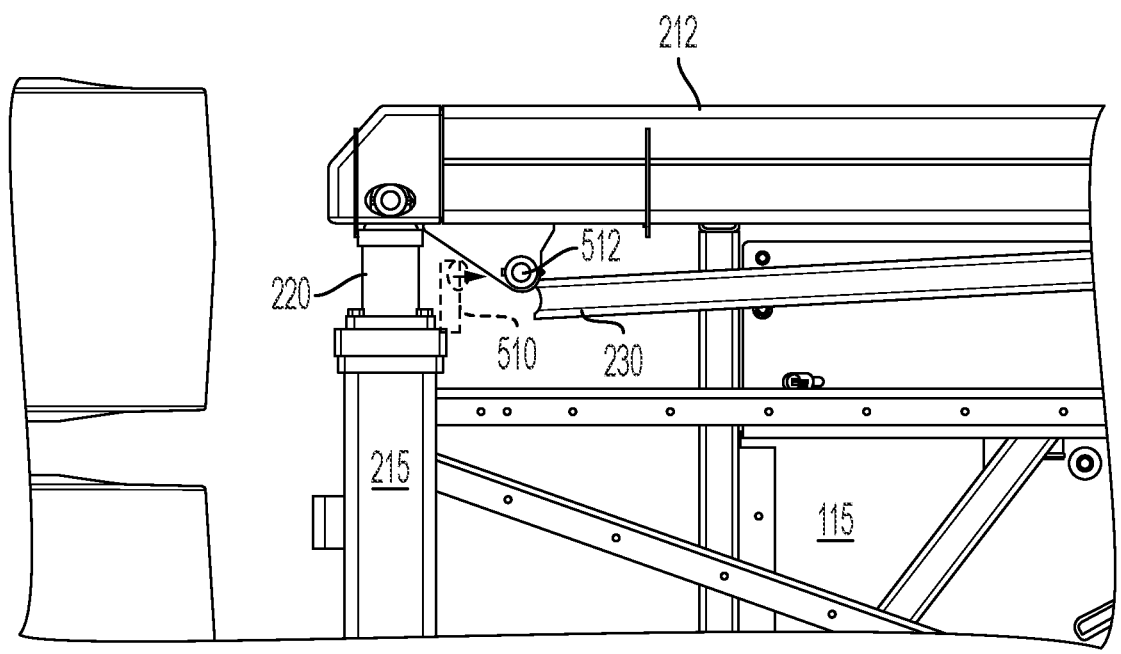
FIG. 17 is a close-up view of the impact buffer and impact bar connection of FIG. 16, further including an impact sensor according to still further principles of the present inventive concepts.
Figure 24:
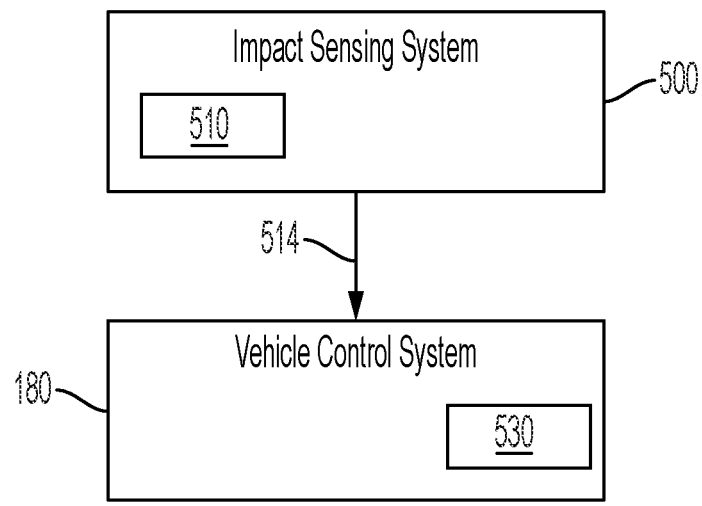
FIG. 24 is a block diagram illustrating communication between an impact sensing system and a vehicle control system.
Figure 25:
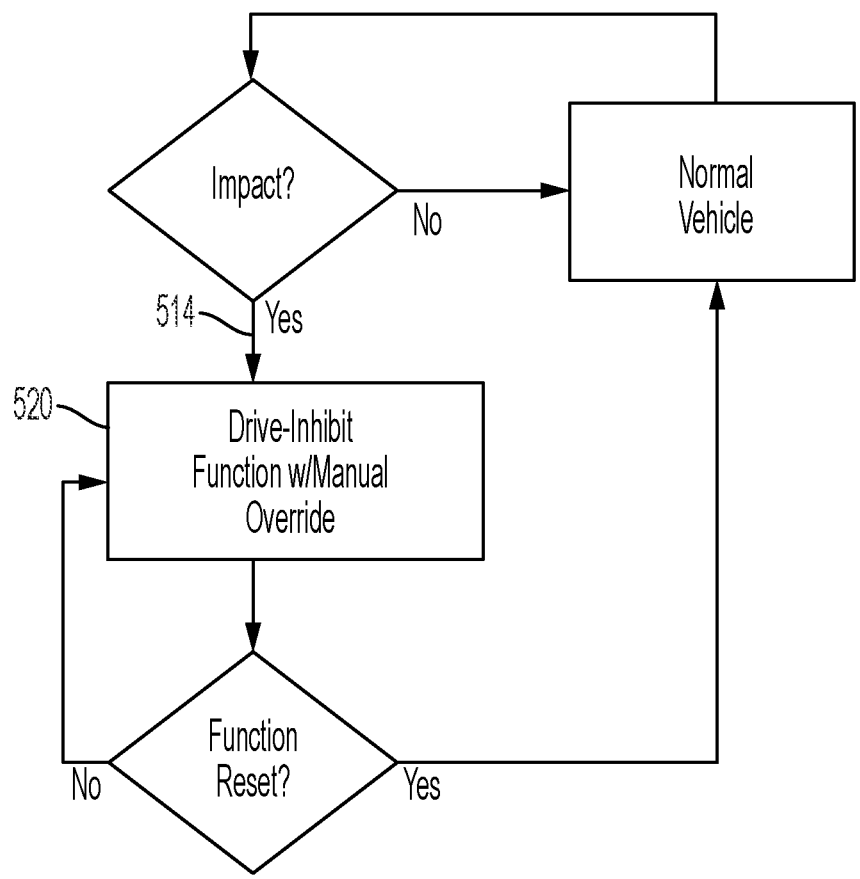
FIG. 25 is a flow diagram illustrating a method of restricting vehicle operation in response to impact detection according to still further principles of the present inventive concepts.

Referring additionally to FIGS. 17 and 24-25, according to another aspect of the present inventive concepts, an impact-sensing system 500 can be provided to detect impacts to the sides of the vehicle 100. In one embodiment, an impact sensor 510, such as an induction sensor or other longitudinal distance or force sensor, is arranged in the impact protective structure 200 to detect movement of or force applied to the impact bar 210. The impact sensor 510 can be mounted on the fixed part of the vehicle 100, such as the main frame 115 or the impact frame 215. A trigger plate 512 can be mounted on the moving impact bar 210, 212. The sensor 510 can be configured to detect movement of the trigger plate 512. Upon inward movement (or force detection) of the impact bar 210, 212 (e.g., as a result of impact), the sensor 310 detects the movement (or force) and triggers an impact alert 514 and an appropriate response from the vehicle control system 180.

In one embodiment, once the sensor 510 triggers an impact alert 514, the vehicle control system 180 responds with a "drive-inhibit" function 520 that substantially immediately removes full torque from the vehicle motor (not shown) to prevent any further damage due to continued impact with the colliding object. For instance, if the side of a vehicle 100 impacts an object such as a stack of containers or other items, the torque can be substantially immediately removed to prevent the vehicle 100 from continuing to push against the obstacles. This can be particularly important for larger trucks where impacts might not be felt by the operator.

A manual override option can be provided to allow an operator to continue driving after an impact has triggered the drive-inhibit function 520. The manual override can, for instance, be activated using a button 530 located inside the cab that communicates with the vehicle control system 180 and must be continuously pressed by the operator to drive the vehicle 100 back to a service station. The override button 530 preferably only permits driving while the button is pressed and does not reset the impact alert 514 or the drive-inhibit function 520. It permits the driver to drive away from danger such as falling objects or unstable stacks, but requires a dealer or service personnel to reset the function after evaluating the damage from impact and making any necessary repairs.

According to another aspect of the present inventive concepts, the impact frame 215 can further provide a structure for retrofitting existing vehicles 100 with additional automation features, such as laser sensing, LIDAR, etc. Automation features can, for example, be added to the impact frame 215 as a kit and then retrofitted onto the vehicle 100.

CONCLUSION

Various other improvements are also contemplated and numerous variations to the specific designs identified above are possible without departing from the spirit and scope of the inventive concepts. Having described and illustrated principles of the present inventive concepts in various preferred embodiments thereof, it should be apparent that the invention can be modified in arrangement and detail without departing from such principles. In particular, it should be apparent that the systems and methods described herein could be used for vehicles other than materials-handling vehicles and for other moving devices and that various other arrangements and locations of impact bars and buffers could be provided (such as at a front and/or rear of the vehicle).

The terms and descriptions used above are set forth by way of illustration and example only and are not meant as limitations. Those skilled in the art will recognize that many variations, enhancements, and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in continuation or reissue patent applications, and equivalents to the foregoing claims.

The invention claimed is:

1. An impact-protective structure that provides protection from an impact force for a materials-handling vehicle containing a fuel cell or a hydrogen cylinder, said impact protective structure comprising:
    an impact frame configured to be connected to a vehicle frame;
    one or more impact bars connected to the impact frame using one or more impact buffers, wherein the impact buffers are configured to permit the impact bars to move inward toward the impact frame by up to a predetermined distance by linearly absorbing an impact force; and
    an impact sensor, wherein the impact sensor is configured to detect an impact to the one or more impact bars,
    wherein the impact sensor is configured to send an impact alert signal to a vehicle control system in response to an impact with the one or more impact bars, and
    wherein the vehicle control system is configured to cause the vehicle to enter a drive-inhibit function that removes torque from a vehicle motor in response to the impact alert signal until the drive-inhibit function is reset.

2. An impact protective structure according to claim 1, wherein each of the one or more impact bars comprises a slotted hole for receiving a hinge pin that connects the impact bar to the impact buffer.

3. An impact protective structure according to claim 1, wherein the vehicle control system comprises a manual override that permits a vehicle operator to drive during the drive-inhibit function.

4. An impact protective structure according to claim 3, wherein the manual override comprises a button that must be continuously depressed in order to drive the vehicle during the drive-inhibit function.

5. An impact protective structure according to claim 1, wherein the drive-inhibit function cannot be reset by a vehicle operator.

6. An impact protective structure according to claim 1, further comprising:
one or more bearings arranged between the impact buffer and the impact bar.

7. An impact protective structure according to claim 6, wherein at least one of the bearings is configured to provide a more direct path for an impact force on the impact bar to travel into the impact buffer.

8. A reach truck comprising:
a vehicle frame;
at least one modular frame connected to an outside of the vehicle frame;
a plurality of components arranged within the at least one modular frame including at least a fuel cell or a hydrogen cylinder;
an impact protection structure comprising an impact frame connected to the vehicle frame, said impact protection structure configured to protect the at least one modular frame and its components from damage resulting from impact, wherein the impact protection structure comprises one or more impact bars connected to the impact frame through one or more impact buffers; and
an impact sensor, wherein the impact sensor is configured to detect an impact to the one or more impact bars,
wherein the impact sensor is configured to send an impact alert signal to a vehicle control system in response to an impact with the one or more impact bars, and
wherein the vehicle control system is configured to cause the reach truck to enter a drive-inhibit function that removes torque from a vehicle motor in response to the impact alert signal until the drive-inhibit function is reset.

9. A reach truck according to claim 8, wherein the one or more impact buffers are configured to linearly absorb energy over a predetermined displacement distance.

10. A reach truck according to claim 8, wherein the one or more impact bars each comprise one or more slotted holes, wherein each slotted hole is configured to receive a hinge pin that connects one impact buffer to one impact bar.

11. A reach truck according to claim 8, wherein the impact frame is connected to the vehicle frame using bolts or pins, and further comprising an elastic or semi-elastic bushing arranged between each of the bolts or pins and the vehicle frame to permit some deformation of the vehicle frame without deforming the impact frame.

12. A reach truck according to claim 8, further comprising a manual override configured to override the drive-inhibit function when activated and to permit a vehicle operator to drive during the drive-inhibit function.

13. A reach truck according to claim 12, wherein the manual override comprises a button that must be continuously depressed in order to drive the vehicle during the drive-inhibit function.

14. A reach truck according to claim 8, wherein the impact sensor comprises one or more force sensors configured to detect an impact force.

15. A reach truck according to claim 8, wherein the vehicle control system requires an authorized service personnel to reset the drive-inhibit function.

* * * * *